United States Patent
Choi et al.

(10) Patent No.: US 8,441,986 B2
(45) Date of Patent: *May 14, 2013

(54) METHOD FOR PARTITIONING CELL IDENTITIES ACCORDING TO CELL TYPE IN WIRELESS COMMUNICATION SYSTEM AND AN APPARATUS THEREFOR

(75) Inventors: Jinsoo Choi, Gyeonggi-do (KR); Hangyu Cho, Gyeonggi-do (KR); Jinsam Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 263 days.

This patent is subject to a terminal disclaimer.

(21) Appl. No.: 12/972,676

(22) Filed: Dec. 20, 2010

(65) Prior Publication Data

US 2012/0155384 A1      Jun. 21, 2012

(51) Int. Cl.
*H04W 4/00*      (2009.01)

(52) U.S. Cl.
USPC .......................................................... 370/328

(58) Field of Classification Search .................. None
See application file for complete search history.

(56) References Cited

U.S. PATENT DOCUMENTS

| | | | | |
|---|---|---|---|---|
| 2003/0125031 | A1* | 7/2003 | Sung Lim et al. | 455/447 |
| 2011/0007690 | A1* | 1/2011 | Chang et al. | 370/328 |
| 2011/0044244 | A1* | 2/2011 | Etemad | 370/328 |
| 2011/0044268 | A1* | 2/2011 | Choi et al. | 370/329 |
| 2011/0070867 | A1* | 3/2011 | Venkatachalam et al. | 455/411 |
| 2011/0090884 | A1* | 4/2011 | Won et al. | 370/338 |
| 2011/0149878 | A1* | 6/2011 | Ahmadi et al. | 370/329 |
| 2011/0194529 | A1* | 8/2011 | Cho et al. | 370/331 |

* cited by examiner

*Primary Examiner* — Anh-Vu Ly

(74) *Attorney, Agent, or Firm* — Morgan, Lewis & Bockius LLP

(57) ABSTRACT

A method of transmitting a cell type information, which is transmitted by a base station in a wireless communication system, is disclosed. The present invention includes broadcasting a first boundary point information (Z) between a cell identity of a public ABS (advanced base station) and a cell identity of a private ABS via an S-SFH SP3 (secondary-super frame header subpacket3), and broadcasting at least one second boundary point (K) information via an AAI-SCD (Advanced Air Interface_System Configuration Descriptor) message. In this case, the at least one second boundary point information (K) indicates a last index of cell identity corresponding to a specific ABS type. Further, an order of ABS types of the public ABS and an order of ABS types of the private ABS are pre-defined.

12 Claims, 8 Drawing Sheets

METHOD FOR PARTITIONING CELL IDENTITIES ACCORDING TO CELL TYPE IN WIRELESS COMMUNICATION SYSTEM AND AN APPARATUS THEREFOR

BACKGROUND OF THE INVENTION

1. Field of the Invention

The present invention relates to a wireless communication system, and more particularly, to a method for partitioning cell identities according to a cell type in a wireless communication system and apparatus therefor.

2. Discussion of the Related Art

First of all, FIG. 1 exemplarily shows a wireless communication system. Referring to FIG. 1, a wireless communications system 100 consists of a plurality of base stations 110 and a plurality of mobile stations 120. The wireless communications system 100 can include a homogeneous network or a heterogeneous network. In this case, the heterogeneous network represents the network in which different network entities including macro cells, femto cells, relays and the like coexist. The base station is a fixed station that communicates with a mobile station in general. And, the base stations 110a, 110b and 110c provide services to specific geographical areas 102a, 102b and 102c, respectively. In order to enhance system performance, each of the specific geographical areas can be further divided into a plurality of smaller regions 104a, 104b and 104c for example. Each of the smaller areas can be named a cell, a sector or a segment. In IEEE 802.16e system, a cell identity (cell_ID or IDCell) is given with reference to a whole system. On the contrary, a sector or segment identity is given with reference to a specific area in which each base station provides a service and has a value set to one of 0 to 2. The mobile station 120 is distributed in the wireless communication system in general and is fixed or movable. Each of the mobile stations is able to communicate with at least one base station at a random moment in uplink ((UL) or downlink (DL). A base station and a mobile station are able to communicate with each other using one of CDMA (code division multiple access) system, FDMA (frequency division multiple access) system, TDMA (time division multiple access) system, SC-FDMA (single carrier frequency division multiple access) system, MC-FDMA (multi carrier frequency division multiple access) system, OFDMA (orthogonal frequency division multiple access) system, a combination thereof and the like. In this disclosure, 'uplink' indicates a communication link from a mobile station to a base station. And, 'downlink' indicates a communication link from a base station to a mobile station.

SUMMARY OF THE INVENTION

Accordingly, the present invention is directed to a method for partitioning cell identities according to a cell type in a wireless communication system and apparatus therefor that substantially obviate one or more of the problems due to limitations and disadvantages of the related art.

An object of the present invention is to provide a method for partitioning cell identities according to a cell type in a wireless communication system and apparatus therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, a method of transmitting a cell type information, which is transmitted by a base station in a wireless communication system, includes broadcasting a first boundary point information (Z) between a cell identity of a public ABS (advanced base station) and a cell identity of a private ABS via an S-SFH SP3 (secondary-super frame header subpacket3), and broadcasting at least one second boundary point (K) information via an AAI-SCD (Advanced Air Interface_System Configuration Descriptor) message. In this case, the at least one second boundary point information (K) indicates a last index of cell identity corresponding to a specific ABS type, and an order of ABS types of the public ABS and an order of ABS types of the private ABS are pre-defined.

Preferably, the at least one second boundary point information (K) is a boundary point position by setting granularity of 10 sequences or 20 sequences per segment.

Preferably, the ABS types of the public ABS includes a Macro ABS, a Macro hot-zone ABS, a relay ABS and an OSG (open subcarrier group) femto ABS. Further, the ABS types of the private ABS includes a CSG (closed subscriber group) open-femto ABS and a CSG closed-femto ABS.

More preferably, the first boundary point information (Z) is a range information of cell identity partitions partitioned by granularity of 10 sequences or 20 sequences per segment, and the range information of cell identity partitions includes information that all cell identities are cell identities of the private ABS or information that all cell identities are cell identities of the public ABS except for cell identities of a macro ABS.

In this case, the first boundary point information (Z) includes 86 cell identities for a macro ABS per segment.

Preferably, a size of each of the at least one second boundary point information (K) is 4 bits.

To further achieve these and other advantages and in accordance with the purpose of the present invention, a method of receiving a cell type information, which is received by a mobile station in a wireless communication system, includes receiving a first boundary point information (Z) between a cell identity of a public ABS (advanced base station) and a cell identity of a private ABS via an S-SFH SP3 (secondary-super frame header subpacket3) broadcasted from a base station, and receiving at least one second boundary point (K) information via an AAI-SCD (Advanced Air Interface_System Configuration Descriptor) message broadcasted from the base station. In this case, the at least one second boundary point information (K) indicates a last index of cell identity corresponding to a specific ABS type, and an order of ABS types of the public ABS and an order of ABS types of the private ABS are pre-defined.

Preferably, the at least one second boundary point information (K) is a boundary point position by setting granularity of 10 sequences or 20 sequences per segment.

Preferably, the ABS types of the public ABS includes a Macro ABS, a Macro hot-zone ABS, a relay ABS and an OSG (open subcarrier group) femto ABS, and the ABS types of the private ABS includes a CSG (closed subscriber group) open-femto ABS and a CSG closed-femto ABS.

More preferably, the first boundary point information (Z) is a range information of cell identity partitions partitioned by granularity of 10 sequences or 20 sequences per segment, and the range information of cell identity partitions includes information that all cell identities are cell identities of the private ABS or information that all cell identities are cell identities of the public ABS except for cell identities of a macro ABS.

In this case, the first boundary point information (Z) includes 86 cell identities for a macro ABS per segment.

Preferably, wherein a size of each of the at least one second boundary point information (K) is 4 bits.

Accordingly, the present invention provides the following effects or advantages.

First of all, the present invention is able to detect a cell identity more efficiently in IEEE 802.16m wireless communication system.

Secondly, the present invention is able to efficiently partition cell identities according to a cell type.

Thirdly, the present invention is able to reduce overhead of a terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, embodiments of the present invention in the following description are examples for applying the technical features of the present invention are applied to a system that uses a plurality of orthogonal subcarriers. For clarity and convenience of the following description, the present invention is described using IEEE 802.16 system for example. And, the present invention is applicable to various wireless communication system including 3GPP (3rd Generation Partnership Project) system.

Figure 1:
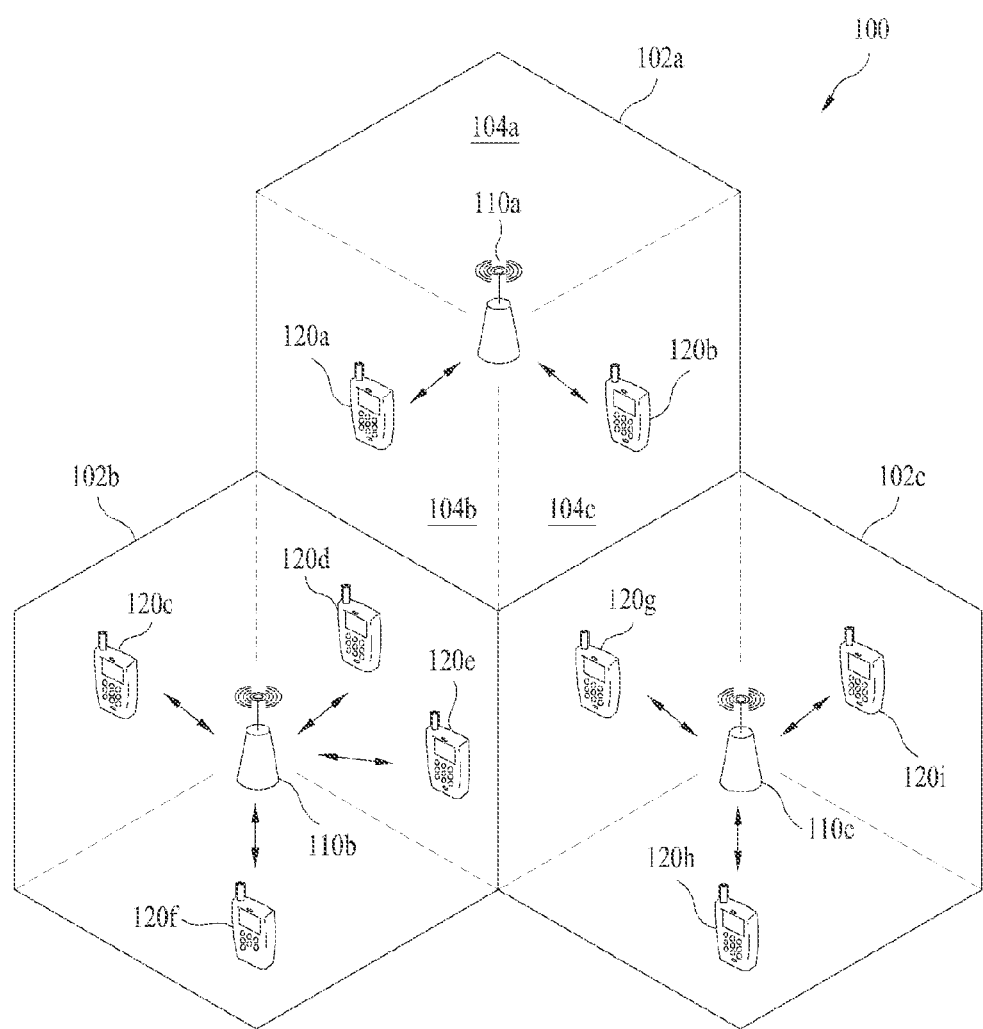
FIG. 1 is a diagram of an example for a wireless communication system.
Figure 2:
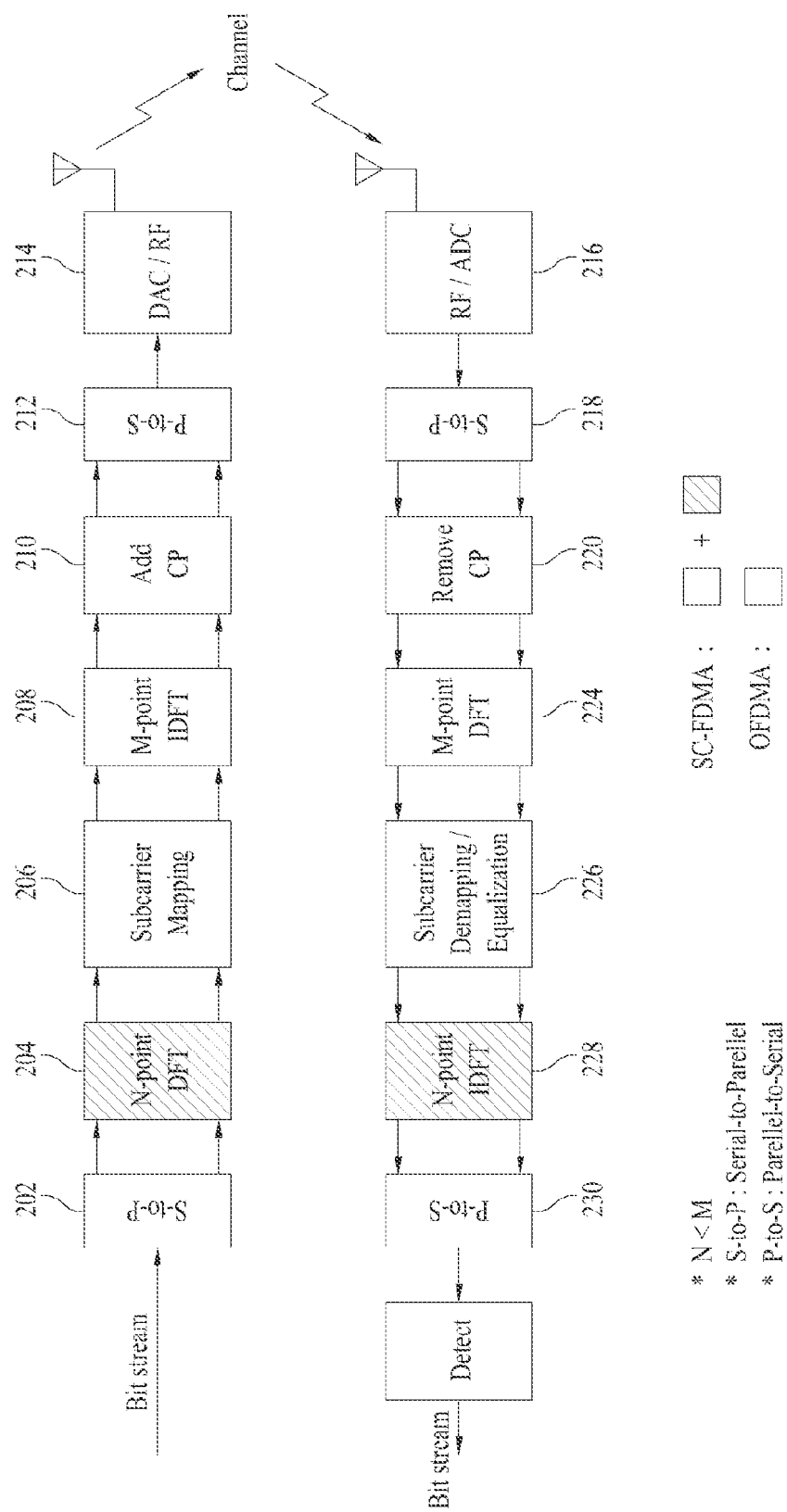
FIG. 2 is a block diagram of an example for a transmitter and receiver for OFDMA and SC-FDMA.

FIG. 2 is a block diagram for an example of a transmitter and receiver for OFDMA and SC-FDMA. In uplink, a transmitter may include a part of a mobile station and a receiver may include a part of a base station. In downlink, a transmitter may include a part of a base station and a receiver may include a part of a mobile station.

Referring to FIG. 2, an OFDMA transmitter includes a Serial to Parallel converter 202, a subcarrier mapping module 206, an M-point IDFT (Inverse Discrete Fourier Transform) module 208, a cyclic prefix (CP) adding module 210, a Parallel to Serial converter 212 and an RF/DAC (Radio Frequency/Digital to Analog) converter module 214.

A signal processing process in an OFDMA transmitter is described as follows. First of all, a bitstream is modulated into a data symbol sequence. Particularly, it is able to obtain the bitstream by performing various signal processings including channel encoding, interleaving, scrambling and the like on a data block delivered from a MAC (medium access control) layer. A bitstream is often called a codeword and is equivalent to a data block received from a MAC layer. And, the data block received from the MAC layer can be called a transport block as well. Modulation scheme is non-limited by the above description and can include one of BPSK (Binary Phase Shift Keying), QPSK (Quadrature Phase Shift Keying), n-QAM (n-Quadrature Amplitude Modulation) and the like. Subsequently, a serial data symbol sequence is converted to N data symbols in parallel [202]. The N data symbols are mapped to N subcarriers allocated among total M subcarriers and the (M−N) remaining subcarriers are padded with 0 [206]. The data symbol mapped in a frequency domain is transformed into a time-domain sequence through M-point IDFT processing [208]. Afterwards, in order to reduce inter-symbol interference (ISI) and inter-carrier interference (ICI), OFDMA symbol is generated by adding a cyclic prefix to the time-domain sequence [210]. The generated OFDMA symbol is converted from parallel to serial [s21]. The OFDMA symbol is then transmitted to a receiver through digital-to-analog conversion, frequency uplink transform and the like [214]. And, available subcarriers among the (M−N) remaining subcarriers are allocated to another user. Meanwhile, an OFDMA receiver includes an RF/ADC (radio frequency/analog to digital converter) module 216, a serial to parallel converter 218, a CP removing (CP remove) module 220, an M-point DFT (discrete Fourier transform) module 224, a subcarrier demapping/equalization module 226, a parallel to serial converter 228 and a detection module 230. A signal processing process of the OFDMA receiver has a configuration in reverse to that of the OFDMA transmitter.

Meanwhile, compared to the OFDMA transmitter, an SC-FDMA transmitter further includes an N-point DFT module 204 behind the subcarrier mapping module 206. The SC-FDMA transmitter spreads a plurality of data in a frequency domain through DFT prior to IDFT processing, thereby considerably decreasing a PAPR (peak-to-average power ratio) into a level lower than that of OFDMA system. Compared to the OFDMA receiver, an SC-FDMA receiver further includes an N-point IDFT module 228 next to the subcarrier demapping module 226. And, a signal processing process of the SC-FDMA receiver has a configuration in reverse to that of the SC-FDMA transmitter.

The modules exemplarily shown in FIG. 2 are provided for the above description only. The transmitter and/or the receiver can further include at least one necessary module. The modules/functionality can be omitted in part or may be separable into different modules/functionality. At least two of the modules can be integrated into one module.

is a nominal channel bandwidth. The $N_{used}$ is the number of subcarriers used for signal transmission. The n is a sampling factor and determines subcarrier spacing and a useful symbol time together with BW and $N_{used}$. And, the G indicates a ratio of a CP type to a useful time.

Table 1 shows examples of OFDMA parameters.

TABLE 1

| The nominal channel bandwidth, BW (MHz) | | 5 | 7 | 8.75 | 10 | 20 |
|---|---|---|---|---|---|---|
| Sampling factor, n | | 28/25 | 8/7 | 8/7 | 28/25 | 28/25 |
| Sampling frequency, $F_s$ (MHz) | | 5.6 | 8 | 10 | 11.2 | 22.4 |
| FFT size, $N_{FFT}$ | | 512 | 1024 | 1024 | 1024 | 2048 |
| Subcarrier spacing. Δf (kHz) | | 10.94 | 7.81 | 9.77 | 10.94 | 10.94 |
| Useful symbol time, $T_b$ (μs) | | 91.4 | 128 | 102.4 | 91.4 | 91.4 |
| CP ratio, G = 1/8 | OFDMA symbol time, $T_s$ (μs) | 102.857 | 144 | 115.2 | 102.857 | 102.857 |
| | FDD Number of OFDMA symbols per 5 ms frame | 48 | 34 | 43 | 48 | 48 |
| | Idle time (μs) | 62.857 | 104 | 46.40 | 62.857 | 62.857 |
| | TDD Number of OFDMA symbols per 5 ms frame | 47 | 33 | 42 | 47 | 47 |
| | TTG + RTG (μs) | 165.714 | 248 | 161.6 | 165.714 | 165.714 |
| CP ratio, G = 1/16 | OFDMA symbol time, $T_s$ (μs) | 97.143 | 136 | 108.8 | 97.143 | 97.143 |
| | FDD Number of OFDMA symbols per 5 ms frame | 51 | 36 | 45 | 51 | 51 |
| | Idle time (μs) | 45.71 | 104 | 104 | 45.71 | 45.71 |
| | TDD Number of OFDMA symbols per 5 ms frame | 50 | 35 | 44 | 50 | 50 |
| | TTG + RTG (μs) | 142.853 | 240 | 212.8 | 142.853 | 142.853 |
| CP ratio, G = 1/4 | OFDMA symbol time, $T_s$ (μs) | 114.286 | 160 | 128 | 114.286 | 114.286 |
| | FDD Number of OFDMA symbols per 5 ms frame | 43 | 31 | 39 | 43 | 43 |
| | Idle time (μs) | 85.694 | 40 | 8 | 85.694 | 85.694 |
| | TDD Number of OFDMA symbols per 5 ms frame | 42 | 30 | 38 | 42 | 42 |
| | TTG + RTG (μs) | 199.98 | 200 | 136 | 199.98 | 199.98 |
| Number of Guard Sub-Carriers | Left | 40 | 80 | 80 | 80 | 160 |
| | Right | 39 | 79 | 79 | 79 | 159 |
| Number of Used Sub-Carriers | | 433 | 865 | 865 | 865 | 1729 |
| Number of Physical Resource Unit (18 × 6) in a type-1 subframe. | | 24 | 48 | 48 | 48 | 96 |

Figure 3:
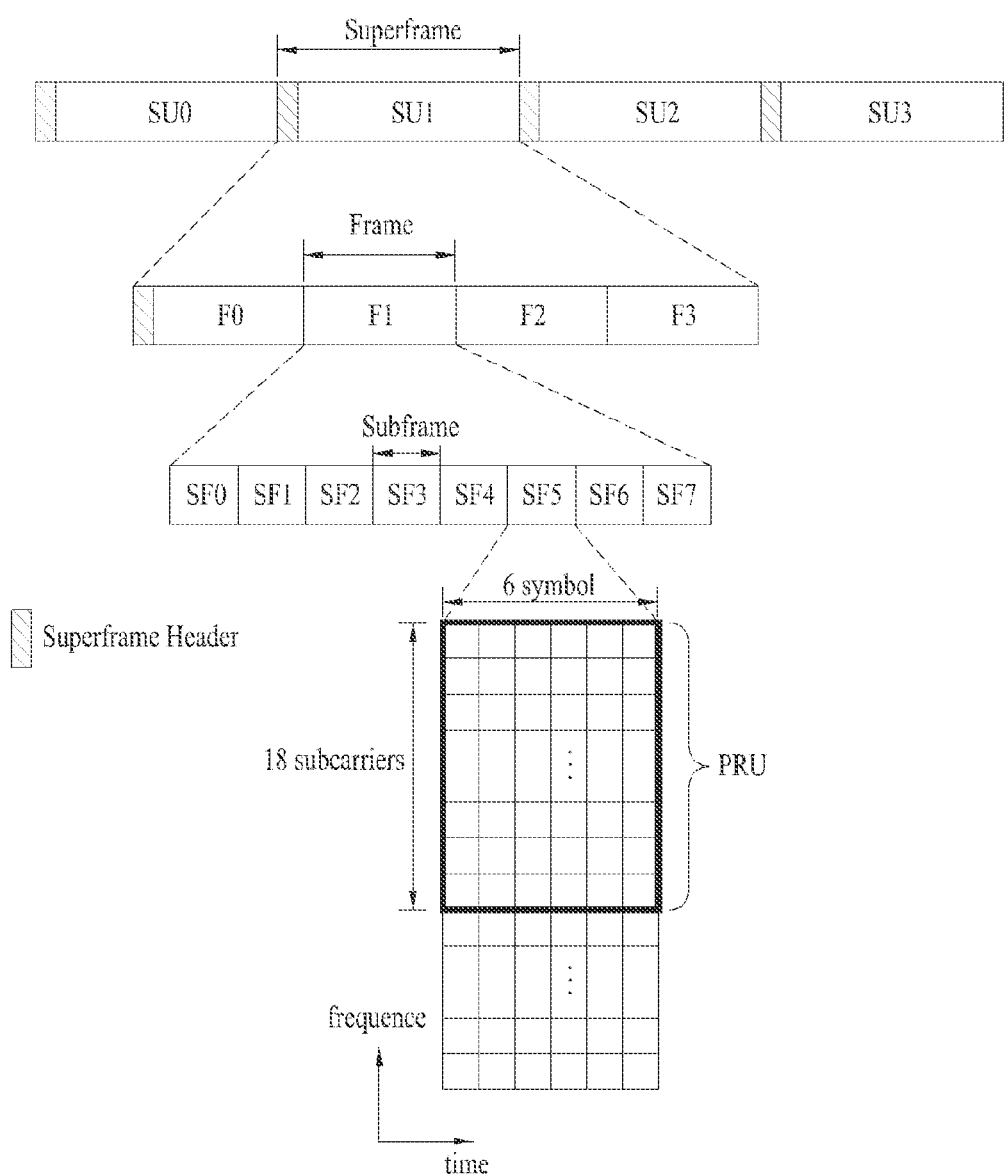
FIG. 3 is a diagram of a structure of a radio frame according to a duplex mode in an IEEE 802.16m system.

FIG. 3 is a diagram for an example of a radio frame structure in IEEE 802.16m system.

Referring to FIG. 3, a radio frame structure includes 20ms-superframes SU0 to SU3 capable of supporting 5 MHz, 8.75 MHz, 10 MHz or 20 MHz. The superframe includes 4 5ms-frames F0 to F3 equal to each other in size and starts with a superframe header (SFH). The superframe header carries an essential system parameter and system configuration information.

A frame includes 8 subframes SF0 to SF7. The subframe is allocated to downlink or uplink transmission. The subframe includes a plurality of OFDM symbols in time domain or includes a plurality of subcarriers in frequency domain. The OFDM symbol can be called OFDMA symbol, SC-FDMA symbol or the like according to a multiple access system. The number of OFDM symbols included in a subframe can be variously modified according to a channel bandwidth, a CP length and the like.

OFDM symbol includes a plurality of subcarriers. And, the number of the subcarriers is determined according to a size of FFT (fast Fourier transform). Types of subcarriers can be classified into a data subcarrier for data transmission, a pilot subcarrier for channel measurement, and a null subcarrier for a guard band and a DC component. Parameters for characterizing an OFDM symbol include BW, $N_{used}$, n, G, etc. The BW FIG. 4 is a diagram of an example for transmitting a synchronization channel in an IEEE 802.16m system.

Figure 4:
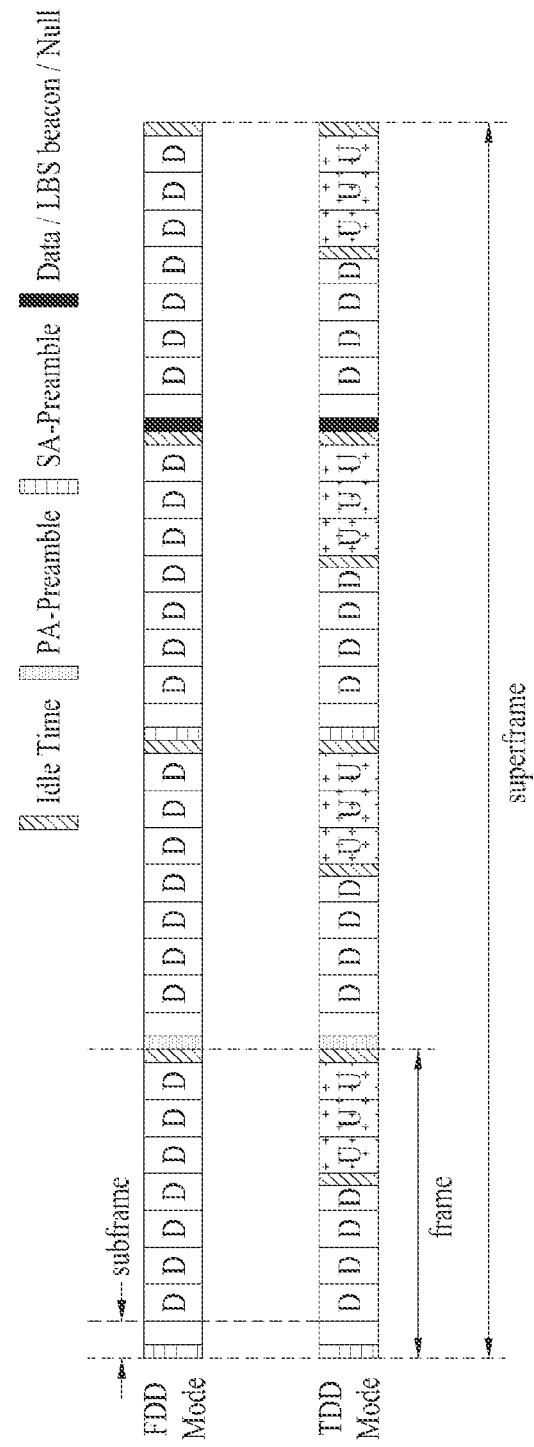
FIG. 4 is a diagram of an example for transmitting a synchronization channel in an IEEE 802.16m system.

Referring to FIG. 4, in an IEEE 802.16m system, 3 synchronization channels are carried on one super frame SU1~SU4. In the IEEE 802.16m system, a downlink synchronization channel includes a primary synchronization channel and a secondary synchronization channel. The primary synchronization channel includes a PA-preamble (primary advanced preamble). And, the secondary synchronization channel includes an SA-preamble (secondary advanced preamble). In FDD or TDD mode, a downlink synchronization channel can be transmitted via a first OFDMA symbol of a frame.

The PA-preamble is normally used to obtain partial information such as communication system frequency bandwidth information, subcarrier setting information and the like. The SA-preamble is normally used to obtain a cell identity and can be used for such a usage as RSSI (received signal strength indication) measurement and the like. The PA-preamble is transmitted via a $2^{nd}$ frame (F1), while the SA-preamble can be transmitted via $1^{st}$ and $3^{rd}$ frames (F0 and F2).

Figure 5:
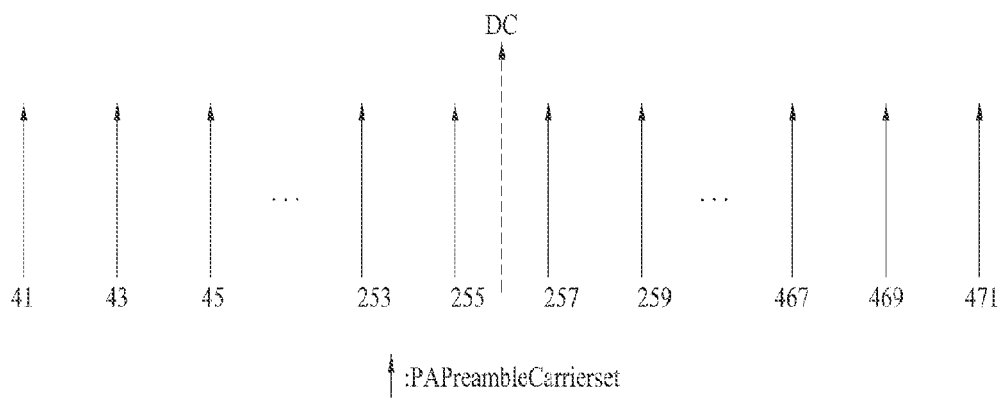
FIG. 5 is a diagram of an example for a subcarrier having a PA-preamble mapped thereto in an IEEE 802.16m system.

FIG. 5 is a diagram of an example for a subcarrier having a PA-preamble mapped thereto in an IEEE 802.16m system.

Referring to FIG. 5, a length of a PA-preamble is 216 and is irrelevant to an FFT size. The PA-preamble is inserted by an interval of 2 subcarriers and the rest sections are padded with zeros. For instance, the PA-preamble can be inserted in the subcarriers 41, 43, ..., 469 and 471. The PA-preamble is able to carry system bandwidth information, subcarrier setting information and the like. If the subcarrier index 256 is reserved as DC, the subcarrier having a sequence mapped thereto can be determined using Formula 1.

PAPreambleCarrierSet=2×k+41    [Formula 1]

In Formula 1, 'k' indicates an integer ranging from 0 to 215. For example, a QPSK type sequence having a length 216 proposed in Table 2 is usable for the PA-preamble.

TABLE 2

| Index | Carrier | BW | Series to modulate |
|---|---|---|---|
| 0 | Fully configured | 5 MHz | 6DB4F3B16BCE59166C9CEF7C3C8CA5EDFC16 A9D1DC01F2AE6AA08F |
| 1 | | 7, 8.75 and 10 MHz | 1799628F3B9F8F3B22C1BA19EAF94FEC4D37D EE97E027750D298AC |
| 2 | | 20 MHz | 92161C7C19BB2FC0ADE5CEF3543AC1B6CE6B E1C8DCABDDD319EAF7 |
| 3 | | Reserved | 6DE116E665C395ADC70A89716908620868A603 40BF35ED547F8281 |
| 4 | | Reserved | BCFDF60DFAD6B027E4C39DB20D783C9F4671 55179CBA31115E2D04 |
| 5 | | Reserved | 7EF1379553F9641EE6ECDBF5F144287E329606 C616292A3C77F928 |
| 6 | | Reserved | 8A9CA262B8B3D37E3158A3B17BFA4C9FCFF4 D396D2A93DE65A0E7C |
| 7 | | Reserved | DA8CE648727E4282780384AB53CEEBD1CBF79 E0C5DA7BA85DD3749 |
| 8 | | Reserved | 3A65D1E6042E8B8AADC701E210B5B4B650B6 AB31F7A918893FB04A |
| 9 | | Reserved | D46CF86FE51B56B2CAA84F26F6F204428C1BD 23F3D888737A0851C |
| 10 | Partially configured | N/A | 640267A0C0DF11E475066F1610954B5AE55E189 EA7E72EFD57240F |

Figure 6:
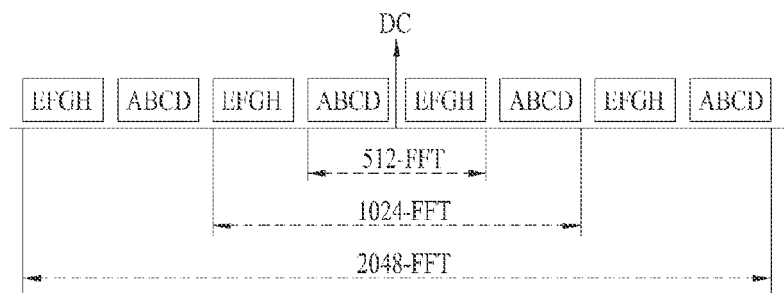
FIG. 6 is a diagram of an example for mapping an SA-preamble to a frequency domain in an IEEE 802.16m system.

FIG. 6 is a diagram of an example for mapping an SA-preamble to a frequency domain in an IEEE 802.16m system.

Referring to FIG. 6, the number of subcarriers allocated to an SA-preamble can vary according to an FFT size. For instance, a length of the SA-preamble can be 144 for 512-FFT, a length of the SA-preamble can be 288 for 1024-FFT, and a length of the SA-preamble can be 576 for 2048-FFT. In case that $256^{th}$, $512^{th}$, and $1,024^{th}$ subcarriers are reserved as DC components for 512-FFT, 1024-FTT and 2048-FFT, respectively, the subcarriers allocated to the SA-preamble can be determined by Formula 2.

$$SAPreambleCarrierSet_n = n + 3 \cdot k + 40 \cdot \frac{N_{SAP}}{144} + \left\lfloor \frac{2 \cdot k}{N_{SAP}} \right\rfloor \quad \text{[Formula 2]}$$

In Formula 2, the n is an SA-preamble carrier set index, is set to a value of 0, 1 or 2, and indicates a segment ID. The $N_{SAP}$ indicates the number of subcarriers allocated to an SA-preamble. And, the k indicates an integer raging from 0 to $N_{SAP}-1$.

Each cell has a cell identity (IDCell) represented as an integer ranging from 0 to 767. The cell identity is defined as a segment index and an index given to each segment. Generally, the cell identity can be determined by Formula 3.

IDCell=256×n+Idx    [Formula 3]

In Formula 3, the n is an SA-preamble carrier set index, is set to a value of 0, 1 or 2, and indicates a segment ID. The Idx indicates an integer ranging from 0 to 255 and is determined by Formula 4.

$$Idx = 2 \cdot \mod(q, 128) + \left\lfloor \frac{q}{128} \right\rfloor \quad \text{[Formula 4]}$$

In Formula 4, the q is an SA-preamble sequence index and includes an integer ranging from 0 to 255.

In case of 512-FFT, a 288-bit SA-preamble is divided into 8 subblocks A, B, C, D, E, F, G and H. And, a length of each of the subblocks is 36 bits. Each segment ID has a different sequence subblock.

The SA-preamble defined in the 802.16m system shall be described in detail later. In case of the 512-FFT, the A, B, C, D, E, F, G and H are sequentially modulated and then mapped to the SA-preamble subcarrier set corresponding to the segment ID. When an FFT size increases, the basic blocks A, B, C, D, E, F, G and H are repeated in the same order. For instance, in case of 1024-FFT, E, F, G, H, A, B, C, D, E, F, G, H, A, B, C and D are sequentially modulated and then mapped to the SA-preamble subcarrier set corresponding to the segment ID.

Figure 7:
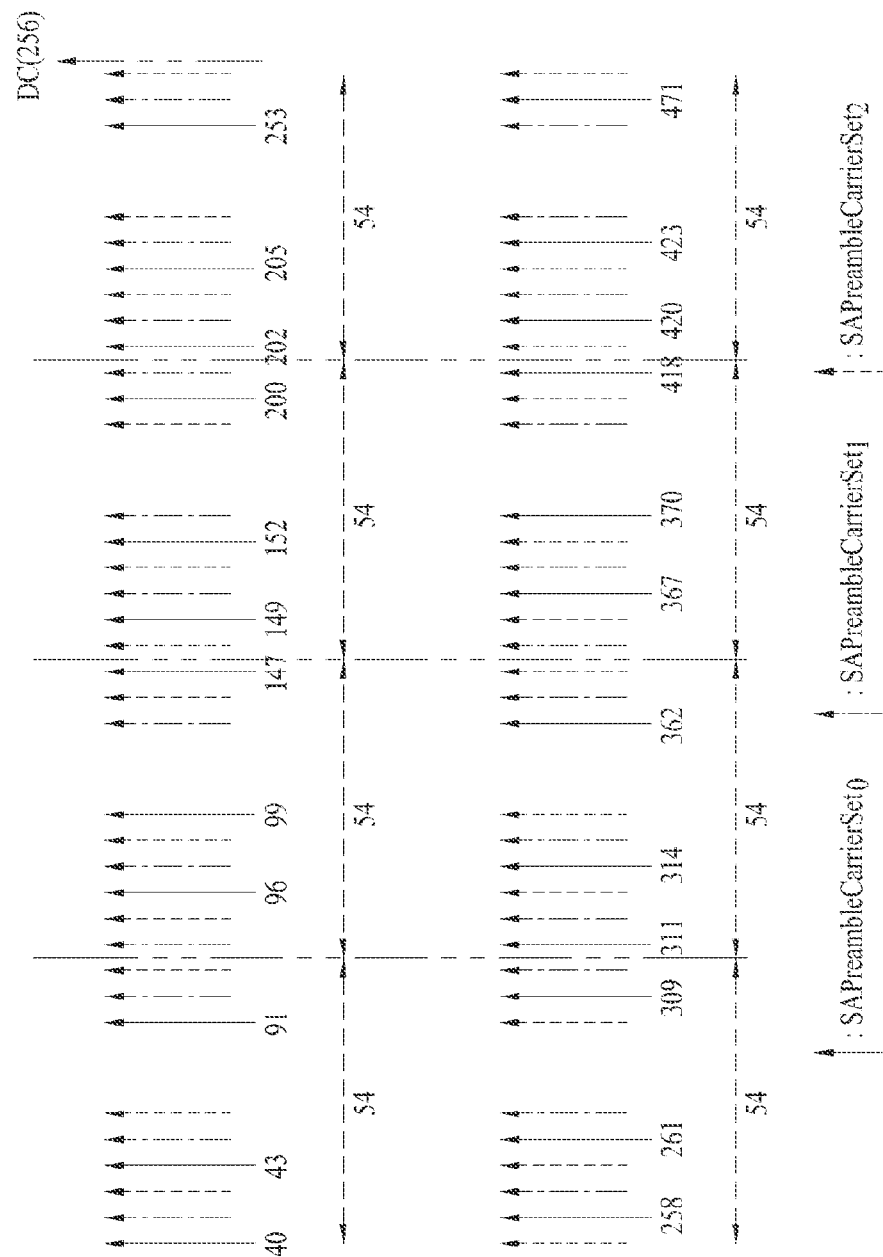
FIG. 7 is a diagram of an example for an SA-preamble structure in frequency domain for 512-FFT in an IEEE 802.16m system.

A circular shift is applicable to 3 contiguous subcarriers after the subcarrier mapping according to Formula 2. Each subblock has the same offset and a circular shift pattern for each subblock becomes [2, 1, 0, ..., 2, 1, 0, ..., 2, 1, 0, 2, 1, 0, DC, 1, 0, 2, 1, 0, 2, ..., 1, 0, 2, ..., 1, 0, 2]. FIG. 7 shows an example for an SA-preamble structure in frequency domain for 512-FFT. In case of the 512-FFT size, blocks A, B, C, D, E, F, G and H can experience right circular shifts of (0, 2, 1, 0, 1, 0, 2, 1), respectively.

Tables 2 t 4 exemplarily show 128 SA-preamble sequences. A mother sequence is indicated by an index q and is represented as hexadecimal format. Sequences of Tables 3 to 5 can correspond to segments 0 to 2, respectively. In Tables 3 to 5, the blk indicates a subblock constructing each sequence.

A modulated sequence can be obtained from transforming $X_i^{(q)}$ (X=A, B, C, D, E, F, G, H) into two QPSK symbols $v_{2i}^{(q)}$ and $v_{2i+1}^{(q)}$. In this case, the i indicates an integer ranging from 0 to 8 and the q indicates an integer ranging from 0 to 127. Formula 5 shows an example for transforming $X_i^{(q)}$ into 2 QPSK symbols.

$$v_{2i}^{(q)} = \exp\left(j\frac{\pi}{2}\left(2 \cdot b_{i,0}^{(q)} + b_{i,1}^{(q)}\right)\right)$$ [Formula 5]

$$v_{2i+1}^{(q)} = \exp\left(j\frac{\pi}{2}\left(2 \cdot b_{i,2}^{(q)} + b_{i,3}^{(q)}\right)\right)$$

In Formula 5, $X_i^{(q)} = 2^3 \cdot b_{i,0}^{(q)} + 2^2 \cdot b_{i,1}^{(q)} + 2^1 \cdot b_{i,2}^{(q)} + 2^0 \cdot b_{i,3}^{(q)}$. By formula 5, binary numbers 00, 01, 10 and 11 are transformed into 1, j, −1 and −j, respectively. This is just exemplary. The $X_i^{(q)}$ can be transformed into QPSK symbols using a similar but different formula.

For example, if a sequence index q is 0, a sequence of a subblock A is 314C8648F. And, this sequence is modulated into QPSK signal of [+1 −j +1 +j +j +1 −j +1 −1 +1 +j −1 +j +1 −1 +1 −j −j].

Meanwhile, 128 sequences exemplarily shown in each of the tables can be extended twice using a complex conjugate operation. In particular, 128 sequences can be additionally generated by the complex conjugate operation and indexes 128 to 255 can be given to the generated sequences, respectively. In other words, an SA-preamble sequence of a sequence index x corresponding to one segment ID in a complex conjugate relation with an SA-preamble sequence of a sequence index x+128 corresponding to the one segment ID. Formula 6 represents a sequence extended from a mother sequence by the complex conjugate operation.

$$v_k^{(q)} = (v_k^{(q-128)})^* \text{ for } 128 \leq q < 255$$ [Formula 6]

In Formula 6, the k indicates an integer ranging from 0 to $N_{SAP}-1$, the $N_{SAP}$ indicates a length of SA-preamble, a complex conjugate operation $(\cdot)^*$ changes a complex signal of (a+jb) into a complex signal of (a−jb) and also changes a complex signal of (a−jb) into a complex signal of (a+jb).

TABLE 3 n = 0: (Segment 0)

| | | | | blk | | | | |
|---|---|---|---|---|---|---|---|---|
| q | A | B | C | D | E | F | G | H |
| 0 | 314C8648F | 18BC23543 | 06361E654 | 27C552A2D | 3A7C69A77 | 011B29374 | 277D31A46 | 14B032757 |
| 1 | 281E84559 | 1A0CDDF7E | 2473A5D5B | 2C6439AB8 | 1CA9304C1 | 0AC3BECD0 | 34122C7F5 | 25362F596 |
| 2 | 00538AC77 | 38F9CBBC6 | 04DBCCB40 | 33CDC6E42 | 181114BE4 | 0766079FA | 2DD2F5450 | 13E0508B2 |
| 3 | 3BE4056D1 | 2C7953467 | 0E5F0DE66 | 03C9B2E7D | 1857FD2E3 | 15A276D4F | 210F282AF | 27CE61310 |
| 4 | 3DBAAE31E | 254AE8A85 | 168B63A64 | 05FDF74DB | 3948B6856 | 33656C528 | 1799C9BA1 | 004E0B673 |
| 5 | 177CE8FBC | 21CEE7F09 | 397CD6551 | 01D4A1A10 | 1730F9049 | 067D89EA9 | 3AC141077 | 3D7AD6888 |
| 6 | 3B78215A1 | 17F921D66 | 385006FDC | 011432C9D | 24ED16EA6 | 0A54922F1 | 02067E65D | 0FEC2128D |
| 7 | 01FF4E172 | 2A704C742 | 3A58705E1 | 3F3F66CD2 | 07CA4C462 | 1854C8AA3 | 03F576092 | 06A989824 |
| 8 | 1A5B7278E | 1630D0D82 | 3001EF613 | 34CCF51A1 | 2120C250A | 06893FA2D | 156073692 | 07178CFA7 |
| 9 | 032E31906 | 2DD318EAA | 1DE55B14D | 0EF4B6FB3 | 27DED0610 | 1BC8440D3 | 0ED86BF8D | 14FAFDE2C |
| 10 | 174725FFD | 0D2FB1732 | 124470F56 | 292D9912B | 1571408A7 | 227197AE9 | 2430BC576 | 0B67304E0 |
| 11 | 1F1DCD669 | 293DD1701 | 0C34F1B84 | 28496EE51 | 3DC41327F | 071C06523 | 28E1657B6 | 02588EFDA |
| 12 | 22E4AA041 | 3810362F1 | 1955F1DE7 | 0D6D2F8BE | 11F31358E | 3EB27BB12 | 1F4E60111 | 119BDA927 |
| 13 | 14300B522 | 152E6D482 | 168DF6E43 | 0740B7AE0 | 14FE7DCDD | 0FA092626 | 23697615A | 1F1331EB8 |
| 14 | 12C65ED00 | 317643CD7 | 2C637A415 | 15E3E5185 | 0F5CBB9E0 | 23290B156 | 26F37EFE8 | 1AA174793 |
| 15 | 1DD6453F0 | 032C4BD39 | 082659BD5 | 320C5E691 | 224E555B2 | 3A9615A8D | 1BED03424 | 28E6A9CED |
| 16 | 068AE7EE9 | 16F724910 | 3803DD9BD | 2A31A2FFB | 010BF5237 | 33CB067E6 | 0280C28B7 | 184417B94 |
| 17 | 1D651280A | 2C7BCF443 | 17324EFB0 | 236E5C411 | 381215183 | 2F076E64E | 0A6F2EE74 | 3DA4196B7 |
| 18 | 27341650F | 1B520099C | 09AC91114 | 000A5F48B | 30AB4B9B6 | 2D0DB0DE6 | 1CF57978A | 2D424406B |
| 19 | 3A01E2FB2 | 0DF5B257B | 019D1C63A | 0EA7DCDDB | 242D96605 | 2DA675F15 | 1DEC54193 | 3B6341C16 |
| 20 | 2DDFAEB05 | 21D0A1700 | 0FA09B788 | 17DA7F8BB | 06E883B3F | 02E6B929B | 2C1C413B4 | 030E46DD1 |
| 21 | 1B625E3F9 | 0F708F756 | 00CD97B18 | 3F036B4DF | 2CF08C3E5 | 213A5A681 | 14A298D91 | 3D2ED63BC |
| 22 | 2DA48D5A9 | 0C085BD17 | 01903428A | 3DF2A30D9 | 29061309A | 16F7DC40E | 2AF88A583 | 27C1DA5E9 |
| 23 | 30DBAC784 | 20C3B4C56 | 0F1538CB7 | 0DDE7E1BE | 2C312903B | 0FF21E6C2 | 032C15DE3 | 26C9A6BA4 |
| 24 | 3188E8100 | 385FEFE2D | 3967B56C7 | 3F62D246B | 1826A755E | 2CDA895EA | 2FAB77825 | 1B525FF88 |
| 25 | 339467175 | 2DE49506B | 27B7282A9 | 0254470A3 | 3374310AF | 2DF20FD64 | 3848A6806 | 11C183E49 |
| 26 | 02AFA38DC | 0F2AFDDF4 | 1A05650E2 | 061439F88 | 11C275BE0 | 30C41DEC9 | 119E070E9 | 1E76542C1 |
| 27 | 1B364E155 | 086FF808C | 29F1BA9DC | 0A830C788 | 2E70D0B3A | 34EA776B1 | 3D13615C0 | 15FC708D4 |
| 28 | 38ECFC198 | 07034E9B3 | 2340F86B3 | 07562464C | 22823E455 | 1F68D29E9 | 257BB66C6 | 1083992F1 |
| 29 | 375C4F5AB | 3C0F5A212 | 0EA21BC30 | 13E8A26F2 | 17C039773 | 283AD6662 | 1F63AB833 | 2DE933CAF |
| 30 | 2B773E3C5 | 3849BBE6C | 1CAD2E5AB | 0405FA1DE | 1B27B4269 | 3B3BF258F | 300E77286 | 39599C4B1 |
| 31 | 1E878F0BE | 0AE5267EC | 376F42154 | 1CD517CC2 | 302781C47 | 123FEC7E0 | 16664D3D8 | 24B871A55 |
| 32 | 20E200C0A | 1C94D2FF1 | 213F8F01B | 369A536E0 | 161588399 | 29389C7FC | 259855CAC | 06025DCE2 |
| 33 | 28D2E001C | 3C51C3727 | 106F37D0E | 1FB0EFDD1 | 2CD9D33C3 | 1EA190527 | 0BB5A6F9E | 074867D50 |
| 34 | 08EFC44B5 | 1B484EABE | 05FEB2DE2 | 211AF91B5 | 0CF52B1E1 | 002B5C978 | 11D6E5138 | 0D402BDD2 |
| 35 | 337C618F4 | 0A4C31DDA | 1D93003D6 | 006D7D088 | 348043A6D | 325E05758 | 2C53EEEB8 | 15ED8E614 |
| 36 | 38375C2FF | 18C78FD02 | 30C11EF53 | 3916581DD | 1B75263FF | 2D8DFD6A9 | 00C4E8482 | 1D201F96A |
| 37 | 2E10B0D05 | 2EF203893 | 2491D95F1 | 34D995B51 | 32214BDF5 | 3E45674B1 | 3E74AC66E | 1B813A999 |
| 38 | 153E7269D | 2391C7BFC | 1ADD3A595 | 0EFD3086E | 00AD88A8E | 0D8B007CA | 0F22C5F9D | 010E86385 |
| 39 | 3B58C7BFF | 0BA76496E | 3AD0B7BBF | 1D6D10FB3 | 3A607BEFC | 28F122A95 | 057950727 | 179449CB7 |
| 40 | 37AC5194A | 390BD9C00 | 3A48C0461 | 12FBCE4C6 | 2A8DD4171 | 10E9F1E34 | 251F5D167 | 1124E96B1 |
| 41 | 0FEF20C67 | 31EC9EA3F | 275B31143 | 22DA4F028 | 352C0F648 | 21FF5B9F3 | 3E5BC2372 | 0A1AE08FE |
| 42 | 080EDC49B | 17AD7F7BA | 390775B3C | 1380B00DA | 2477FF17C | 2E6D9E5AF | 05381F2DD | 26143CC17 |
| 43 | 2DB485795 | 1B3252799 | 39AD0211C | 3AAE31B76 | 30532A187 | 1C8EA5F5A | 2EA6E4D6B | 30570A2E4 |
| 44 | 11BB4F78A | 12CCE1428 | 2C67EEF99 | 20E3F841A | 20CFCD5F2 | 1618A7B94 | 111FF6092 | 2ED034E06 |
| 45 | 1C66335E5 | 0CA9B9BD2 | 3213028AE | 15542DD28 | 290F7DAE2 | 2137F02D5 | 17DF9445D | 24F162FFB |
| 46 | 360FB966B | 17D878955 | 1C1D67093 | 065B84F3A | 1A1D955E3 | 24C73C11E | 270EA9EB2 | 114DCA02C |
| 47 | 002CE84DD | 0616DD253 | 3EB188345 | 1FF852926 | 37E160F00 | 040DF51EC | 1857A33BA | 230FD8A0D |
| 48 | 233C0A71F | 22E428104 | 0325F8170 | 39566B188 | 32DA16A4A | 039FDF1DC | 27A3E946C | 0D69F26D9 |
| 49 | 0583F9F73 | 378380CB6 | 059D8A960 | 3E3442C7F | 026138ADB | 25F370F1E | 09D3EB2CC | 2D37D50C0 |
| 50 | 08DF9CC66 | 2C2E7AA8F | 3CB241ED2 | 03216B4D2 | 39736B451 | 25F6F113F | 08FD2AC3C | 1974574FD |
| 51 | 3D1FF6041 | 2CE2AB97F | 01A734F3B | 1DCF9F3C5 | 268D595CA | 1FBD2A8B8 | 0F1449F86 | 370C352FD |

TABLE 3-continued n = 0: (Segment 0)

blk

| q | A | B | C | D | E | F | G | H |
|---|---|---|---|---|---|---|---|---|
| 52 | 123218E40 | 3AA057589 | 20F73A16F | 26E3BCA5F | 3A7330DC6 | 12C659384 | 39D99FF1B | 276DFC540 |
| 53 | 185AEDEA4 | 0418B3643 | 382F7700A | 3FC35ED60 | 07BA2F838 | 1BC840C93 | 2469A41EC | 0CE7B4CB0 |
| 54 | 2E194E2BF | 3302A0B28 | 1836001EE | 154A4738A | 36A3BBD72 | 23CCD0EB1 | 044B3A13B | 2B50C8057 |
| 55 | 0B76405D3 | 231AAA728 | 0EE05E9B6 | 0093A21F2 | 2065A01D0 | 1F2B810D4 | 1082F3A73 | 1DAFEA492 |
| 56 | 07AD23A3A | 2091957F1 | 3B9D8CBF0 | 21E4160BE | 1BFB25224 | 3D9085D16 | 03076DD39 | 1DBCF8D03 |
| 57 | 226D70EBF | 3ED15246C | 364130C46 | 22F6D4AA3 | 3FCC9A71B | 3B9283111 | 0484F0E58 | 14574BD47 |
| 58 | 3F49B0987 | 305231FA6 | 0CF4F6788 | 3B9296AED | 2346190C5 | 3365711F4 | 078900D4A | 352686E95 |
| 59 | 1D62AC9A4 | 104EDD1F5 | 1B0E77300 | 1CED8E7F0 | 388E8002C | 1FE6199F4 | 02239CB15 | 1FE5D49A2 |
| 60 | 21314C269 | 28600D12A | 22E4F1BAA | 044E211B1 | 0DECFE1B4 | 3E5B208CC | 1CFC91293 | 21E7A906B |
| 61 | 02C029E33 | 1BA88BE4D | 3742AE82F | 21EF0810F | 17D23F465 | 240446FB5 | 17CCE51D9 | 2C0B0E252 |
| 62 | 16F9D2976 | 10185ECE6 | 2821673FD | 02674271C | 3A8A75D7C | 226D4BF0F | 2216004E5 | 0E8605674 |
| 63 | 06E4CB337 | 32A31755D | 062BE7F99 | 1417A922D | 2271C07E5 | 24D6111FA | 3F2639C75 | 0CE2BB3A0 |
| 64 | 18D139446 | 2426B2EA8 | 352F18410 | 1133C535E | 10CC1A28F | 1A8B54749 | 22A54A6F4 | 2F1920F40 |
| 65 | 22443017D | 2265A18F5 | 14E1DAE70 | 11AC6EA79 | 31A740502 | 3B14311E7 | 3AA31686D | 26A3A961C |
| 66 | 2018F4CA9 | 3A0129A26 | 39BDA332E | 1941B7B49 | 03BBCE0D8 | 20E65BD62 | 2E4A6EE6C | 3B095CCB3 |
| 67 | 0CC97E07D | 11371E5FF | 31DFF2F50 | 17D46E889 | 352B75BEA | 1F1529893 | 21E6F4950 | 1BD034D98 |
| 68 | 275B00B72 | 125F0FE20 | 0FB6DE016 | 0C2E8C780 | 3026E5719 | 119910F5F | 3B647515B | 1D49FED6F |
| 69 | 250616E04 | 0882F53BF | 11518A028 | 3E9C4149D | 09F72A7FB | 0CC6F4F74 | 2838C3FD1 | 08E87689B |
| 70 | 212957CC2 | 03DD3475B | 044836A0B | 2463B52C0 | 0342FB4B0 | 34AD95E9B | 2936E2045 | 3B0592D99 |
| 71 | 2922BD856 | 22E06C30C | 390070AED | 09D6DC54F | 3485FA515 | 064D60376 | 07E8288B3 | 3DD3141BF |
| 72 | 29CB07995 | 007EE4B8B | 16E787603 | 07C219E93 | 1031B93DD | 23DEFF60B | 30F1D7F67 | 0EFE02882 |
| 73 | 11F3A0A2F | 38C598A57 | 3FE72D35B | 1F655E0D1 | 0B3AC0D92 | 3430DDB1A | 3BAADBF42 | 02D6124C0 |
| 74 | 05FC8085D | 345A5C470 | 07DAAE1E9 | 0D7150B88 | 25D2A5B10 | 16F8E5021 | 3240EFC71 | 0F0F5922D |
| 75 | 399F32F6E | 2EEB17A8E | 0D61665D0 | 2138EE96F | 3F8119063 | 01B5048F7 | 27075153D | 265DF8280 |
| 76 | 3962CC581 | 2337D2983 | 286FD7BBA | 185126E0E | 1F95AD927 | 0F7EBC374 | 1E3A4B6FF | 20CA9B9BD |
| 77 | 1C85C13AF | 290C37167 | 1FDD26E8F | 0C38736B8 | 0174DB972 | 0A921E3CC | 097557C9D | 09452C1E6 |
| 78 | 2D48D6C00 | 2D9BC8DFE | 10FF1E128 | 25C96BA85 | 0FB071B8E | 0F09B3C9C | 1A3E11441 | 38EDDA03D |
| 79 | 396B88B2F | 0029F4BDB | 30D098CAD | 0D54D12CB | 1D0823F55 | 2DC53B9AA | 11BCF7438 | 33F6EC091 |
| 80 | 21E03CD65 | 1A2FE5B92 | 2851F8445 | 0251E386C | 1468950D8 | 1A8B39748 | 001B42236 | 26CD82DA5 |
| 81 | 2CEA1E6BB | 006C97E74 | 00C2B887D | 23461AF95 | 0E9CB2BD2 | 0B0EA3022 | 1FB56A7A3 | 25A7FA625 |
| 82 | 208FC2A1F | 381C5733A | 03F11D7E3 | 07ED6A7B7 | 1FEC85E09 | 3D61E0440 | 356F4B1C3 | 3756E5042 |
| 83 | 2061E47F0 | 22EAA0AD3 | 24796BB65 | 03C59B4D8 | 32A75E105 | 22155381B | 23E5F041C | 155D2D7F9 |
| 84 | 381AFFB73 | 212B5E400 | 1F1FE108E | 04BF2C90D | 3C1A949D9 | 2854A9B45 | 001B09322 | 3A9372CC1 |
| 85 | 058B23433 | 0904C6684 | 158CADB9E | 11BA4B978 | 1854368F4 | 1919ECEA7 | 147F1FD34 | 2E228AA3C |
| 86 | 34857F3DB | 2CB44F7BF | 111A065D3 | 1BEAB392E | 27F081ED8 | 3E67D1186 | 0F6265AC5 | 27716FAF9 |
| 87 | 38EBB8BF1 | 32ED6E78F | 2B0BA4966 | 2188282AA | 00D49B758 | 1765BA752 | 2B50AFDCC | 068C82450 |
| 88 | 234F0B406 | 02FB239CD | 15AD61139 | 2250A5A05 | 1CD8117E0 | 0D849163F | 268C7A5A6 | 22A802020 |
| 89 | 2D0FE8D16 | 0C14E3771 | 07DE5320C | 0640C2762 | 1CBD9FF4E | 37A91986D | 2024DA401 | 164D4A84C |
| 90 | 3225B4D60 | 3013B75F2 | 2A77AE5C5 | 2C25377EE | 03C8DF835 | 346E80FCB | 116B79FA5 | 356D2B604 |
| 91 | 0D55231FD | 247907F31 | 0CFA0B049 | 36D069A95 | 10D4CDE71 | 1A32544D7 | 38336885F | 173ECC08D |
| 92 | 207420EAC | 26FCFE182 | 3FE7B31C6 | 15B320E13 | 187AA34A8 | 1B52253BF | 1FA16669D | 3725A81A5 |
| 93 | 3C9C7404A | 092B77FEB | 3B9865B46 | 349456F61 | 39B7C6A66 | 3075EC990 | 01BE637DF | 330897B17 |
| 94 | 1CA4C048D | 2B4D50621 | 2BF917627 | 3EA2CC5E1 | 33EC0A1E3 | 05FE0F747 | 349553D72 | 396077301 |
| 95 | 04CEC1C82 | 1F828D D00 | 30122C790 | 1AD8A7895 | 1CE0912C0 | 298382F37 | 2D4D33F06 | 001364B36 |
| 96 | 37F8BB035 | 2F0897994 | 333F5F096 | 0F28AB363 | 20036829F | 338017E2D | 3A5A05D76 | 0CC02E5E0 |
| 97 | 02FD351E6 | 03E316288 | 2FCAEB4F8 | 1C5A80CE3 | 3D3AC3FDD | 3E456746D | 119A5381F | 1581C894E |
| 98 | 1623B3D0F | 103224DB0 | 0FB936BC8 | 2EED7F082 | 26C91513A | 2F12E4C31 | 290F3AEF2 | 392CBFF67 |
| 99 | 02F75DE8F | 2E61A834D | 02A692866 | 1F21044A3 | 2D7881A95 | 18651EE05 | 11FE3D308 | 39EED56DA |
| 100 | 3A858659E | 2F7A87BE0 | 135FD561D | 27B3B651A | 05E131CB9 | 0D5865123 | 2CD6991E5 | 3EE6DF705 |
| 101 | 3F3B247E1 | 32D02B245 | 16B98A593 | 1E4CCFF18 | 0C4A9D285 | 06D519FE2 | 023A336CD | 1B20E999E |
| 102 | 3A9E8B49B | 239656AD1 | 3396D1C51 | 06F4DCF40 | 15D819D3F | 2A3061144 | 20BD2A33E | 2FFB139CD |
| 103 | 38622F3AF | 24BF9BB7F | 1D2729010 | 15877B93A | 00376B0E7 | 0FF064887 | 3505CFD9B | 354C366B6 |
| 104 | 2A0AB7033 | 1AFA65DE1 | 1198D0AD6 | 38E80C86A | 27693D541 | 3BB26F3D4 | 39154881C | 0E7DD6B6B |
| 105 | 1B0DE4333 | 27FE0F6D1 | 0F00B2888 | 0BDA322FF | 2759B5A4F | 0543A2D27 | 0C36DD1E5 | 04E9A262D |
| 106 | 1C7E636BF | 000E9C271 | 2B44F4F30 | 28255BF77 | 1CC4D69CE | 03F4C57B2 | 3E926D59B | 00AA39BDB |
| 107 | 1FDE98AE0 | 0CD076B07 | 171124FB5 | 33F098288 | 1E0B3043E | 39731D117 | 3E7ABC2C8 | 19CC50279 |
| 108 | 28EE855ED | 2A704C371 | 03288F4B0 | 3C83E26C2 | 0A905148B | 18C66BB94 | 1BCC32537 | 10D71AB44 |
| 109 | 26238A065 | 0FBD7BCDD | 02507CF76 | 059F69484 | 3FE0D6F77 | 2466A50DB | 3C07A75B2 | 2DC0F099E |
| 110 | 3CDCD6CBE | 1446783DA | 1626C83F9 | 2FD4C4DF3 | 13A59A2D1 | 2C903D2A3 | 0FD37F076 | 0B1039EDD |
| 111 | 043B07DD7 | 28D9C2155 | 2CCEF57A8 | 34254C1B7 | 09B933B2F | 1FA410127 | 10BD5E9E6 | 010EC6389 |
| 112 | 345E8FCAC | 226BD7EFA | 27341A51C | 23B4A7DD7 | 04C297212 | 0ED0ED8E8 | 319B3BFB8 | 37DBBBF57 |
| 113 | 16FBEFA72 | 1B5EF9484 | 2DEE7A5BF | 097695C12 | 08AEAD5E8 | 3DA7C1327 | 2B81F3E2D | 31AFBED32 |
| 114 | 3484086B1 | 2DFA56B9E | 226E8AFE5 | 285F45484 | 3E69AC8E1 | 1CB33645F | 2DE53BC30 | 2F6ED567E |
| 115 | 1117B5E7D | 122A4D471 | 1AC936544 | 267010D71 | 10428CA47 | 24B72A000 | 2E27FE185 | 1E62C1403 |
| 116 | 0B3161E37 | 038C5D C98 | 100793647 | 1A95D8D36 | 399668787 | 06C0D4922 | 25F48AA58 | 2DFFF1789 |
| 117 | 04FEF7231 | 381910B63 | 298783078 | 30CE5EC1C | 29F6F299D | 3C34CA770 | 37BAAB139 | 3D2069B65 |
| 118 | 18F644052 | 2051880EC | 23ADBF949 | 04237280A | 18304E663 | 287364EFF | 314698D78 | 149A21E51 |
| 119 | 39E14BBCB | 1DBDA9EF4 | 3ECCAD8D3 | 1BA3EF99D | 26D85CEBF | 270547292 | 0FB3C7826 | 0131E73D6 |
| 120 | 2DD6F3F93 | 0FC282088 | 14A143DDD | 0AB840813 | 0B973037C | 29535C9AB | 0DF8DA2AC | 271CBC095 |
| 121 | 1C1D063F9 | 3F4EF6DCC | 00128D932 | 145E31F97 | 0B21590D1 | 38F1602D8 | 3AC2EBB74 | 2320957C5 |
| 122 | 3383C846F | 12128F29B | 19985CE7D | 2834CBBF2 | 1E1513B3D | 364DB5800 | 33EE3F46C | 01A865277 |
| 123 | 0129D260B | 238A85BA0 | 2D81AA924 | 391704866 | 36F857692 | 1D2F813C3 | 0505FB48B | 3DC438BC5 |
| 124 | 05E0F8BDC | 3D978C1F1 | 266F83FCA | 0E89D715A | 01821DEA4 | 12D9AE517 | 22F8EAC2C | 3C098DA58 |
| 125 | 1575D1CE9 | 26F291851 | 3A7BB6D2C | 12CC21A3A | 2975589B0 | 39CF607FF | 388ABF183 | 3D3BAAB0B |

TABLE 3-continued n = 0: (Segment 0)

blk

| q | A | B | C | D | E | F | G | H |
|---|---|---|---|---|---|---|---|---|
| 126 | 101E5EC7A | 0B75BCF3B | 13ED25A86 | 35FC032B6 | 2F6209FF0 | 13C7B2041 | 1F2791466 | 3A759A6C2 |
| 127 | 1EF89091A | 11A653D2C | 223FC1F42 | 2F7B97B31 | 2CA4EE011 | 00F68767D | 10FE34682 | 018339212 |

TABLE 4 n = 1 (Segment 1):

blk

| q | A | B | C | D | E | F | G | H |
|---|---|---|---|---|---|---|---|---|
| 0 | 20A601017 | 10D0A84DE | 0A8C74995 | 07B9C4C42 | 23DB99BF9 | 12114A3F5 | 25341EDB0 | 362D37C00 |
| 1 | 1364F32EC | 0C4648173 | 08C12DA0C | 19BD8D33A | 3F5F0DDA6 | 24F99C596 | 026976120 | 3B40418C7 |
| 2 | 1C6548078 | 0A0D98F3C | 0AC496588 | 38CBF2572 | 22D7DA300 | 1CCEAF135 | 356CA0CCF | 093983370 |
| 3 | 03A8E3621 | 2D2042AF5 | 2AB5CC93B | 05A0B2E2E | 0B603C09E | 117AC5C94 | 2D9DEA5A0 | 0BDFF0D89 |
| 4 | 07C4F8A63 | 3E6F78118 | 32CCD25F2 | 1792A7B61 | 0A8659788 | 1F9708C04 | 086AF6E64 | 040B9CD78 |
| 5 | 2D7EE485A | 2C3347A25 | 3B98E86AF | 242706DC3 | 1CEF639AF | 2E1B0D6A9 | 3E9F78BC1 | 0FB31275F |
| 6 | 0307936D0 | 21CE15F03 | 392655B2D | 17BE2DE53 | 3718F9AB8 | 01A986D24 | 077BDA4EB | 1D670A3A6 |
| 7 | 05A10F7B7 | 31900ACE0 | 28DCA8010 | 2D927ABE5 | 370B33E05 | 31E57BCBE | 030DC5FE1 | 093FDB77B |
| 8 | 092C4FED1 | 268BF6E42 | 24576811F | 09F2DAA7F | 24EFFC8B1 | 21C205A90 | 1E7A58A84 | 048C453EB |
| 9 | 29F162A99 | 1F739A8BF | 09F684599 | 1BEC37264 | 38ED51986 | 286325300 | 344FC460A | 3907B1161 |
| 10 | 0E4616304 | 0FABDCD08 | 0F6D6BE23 | 1B0E7FEDD | 0047DE6C2 | 36742C0C6 | 2D7ABB967 | 10D5481DF |
| 11 | 32DD51790 | 237D6ACFA | 2F691197A | 16724EA58 | 149143636 | 3810C6EE1 | 3A78B3FC6 | 1B1259333 |
| 12 | 1BB0FD4D3 | 235F10A55 | 1C7302A27 | 1148B18E5 | 04F25FBC8 | 2A0A8830C | 3646DBE59 | 2F25F8C30 |
| 13 | 0FB38C45B | 069DF29E9 | 00F93771B | 3AA35746D | 2CAF48FD0 | 0A42CDD55 | 19A23CE8F | 26318A30F |
| 14 | 365FBEDAC | 27710945F | 2AA367D61 | 05A484318 | 2563F27D9 | 2D37D5C00 | 287D18FBB | 3ADB44805 |
| 15 | 3038BC77D | 2A45D29EC | 156173792 | 03EC7679E | 07577E1A4 | 1B6A94A74 | 1D26E5A94 | 0FD878D5A |
| 16 | 1F22158E4 | 3F02A1D37 | 2767EC03F | 1C8CD535A | 23DA2E5AB | 2D5F25A59 | 0971AA889 | 3E78C1846 |
| 17 | 16521E709 | 12C2DB8FE | 3A596C221 | 1562D5C27 | 1D9E1F39A | 345B96872 | 301C7894E | 2797F032D |
| 18 | 2EC951A24 | 1ED768F3F | 11217930A | 39DB44855 | 36E41B3FC | 0F6E48C44 | 36254C517 | 14493C673 |
| 19 | 3EA159E72 | 24ADE96FE | 3458C73A6 | 30674E1FB | 242109AF2 | 24DAF32B6 | 24B1EDFFE | 291CB9D15 |
| 20 | 2AD0E6696 | 04F4077D9 | 1BB279A53 | 38957605B | 379B7A6A0 | 0BAD35616 | 1285EAE51 | 37425C7FF |
| 21 | 083637980 | 34F2E266F | 282846A88 | 19D5E40A6 | 21205942C | 27AC551E9 | 0F3F4C262 | 0505FB522 |
| 22 | 3E7D64856 | 1DB0E599E | 159120A4B | 1FC788139 | 235C454FB | 3CE5B67C8 | 339EADB32 | 0F9F7DDC1 |
| 23 | 3956371B8 | 1D67BE6E5 | 1EFCF7D53 | 041A5C363 | 2E281EB3F | 00AF8A1ED | 2DE24A56F | 1332C0793 |
| 24 | 0818C47A9 | 1F945634B | 1C5ED3403 | 1043B5BF4 | 149702D22 | 024CBB687 | 34B01FA8B | 1E9F5992F |
| 25 | 3A6618167 | 3A0007886 | 3EDB5756B | 2F2FA6FCD | 21A5252B8 | 396FFAD9D | 05347B60C | 2E0ECA200 |
| 26 | 0D45F89A1 | 3F9C22C6E | 1CBCF809E | 3CBE5FCD0 | 3D2DCF245 | 14F351A1E | 224F5B3FF | 2AA6ED34B |
| 27 | 3BA85ADF8 | 282005732 | 3AD7C0223 | 2E73D1800 | 23DEA3F46 | 2275280F6 | 1586270F9 | 0CEF4287B |
| 28 | 07DFE662E | 314B74F2F | 397BDDC4C | 223A8071F | 1F5BE3BB4 | 093BB1F33 | 0FCA2D129 | 21B3526A9 |
| 29 | 39FEADC12 | 0ECE1CD67 | 206228FAA | 38FCCA606 | 0C5EEE08F | 1C1BBDD4E | 1459E42ED | 11FD64ADF |
| 30 | 2735FFB20 | 2AE9B244A | 1A5AED974 | 38FCFD5CB | 20310DB81 | 1C5FC3E24 | 19FB3BA17 | 3785BE865 |
| 31 | 24FF6B7EC | 01C682673 | 19CB14113 | 2C8CD3C2A | 066725853 | 02CD0A23B | 279B54315 | 0CD571063 |
| 32 | 015E28584 | 30B497250 | 127E9B2E1 | 2C675E959 | 05F442DEE | 394AEF6E2 | 079E5C840 | 12703D619 |
| 33 | 3CE4B1266 | 35270B10F | 03549C4B3 | 3B3E6C375 | 1DBEF270E | 0042C9737 | 049522EC6 | 24961653E |
| 34 | 34176CD90 | 2B5E9EAE1 | 1C9E5C2B | 1EF541F4D | 26D1450E6 | 3B9D895AB | 1B0C84349 | 104B6B428 |
| 35 | 07A813421 | 2B39EAADC | 33553571C | 0F8046CDF | 2CF6A7F23 | 0AE3BE8C8 | 308BFF531 | 2DBC0F9E3 |
| 36 | 168276972 | 2CF41744F | 3CF2512E0 | 0F8B68ABC | 2E609F6AF | 04E03AC8C | 0F9B66F49 | 3AFE28736 |
| 37 | 03456021F | 1982574F3 | 0BB2B3F49 | 15A4A1CDE | 15487D58E | 2907C9ABB | 15C0D2D73 | 28D8CFEC3 |
| 38 | 3D3FD677C | 33AF2628F | 3D217FDCF | 30027E85F | 0A463F23B | 2F2AE8324 | 1D1E945E0 | 2EB355D28 |
| 39 | 3BCAF9076 | 3A7D2FF70 | 3C541F38B | 249BD8A94 | 287BC4833 | 141391EB7 | 05B6443D0 | 2FEACC5E7 |
| 40 | 275F118FA | 3A96B346D | 0C713CDE5 | 02F394A28 | 3EBB1D18D | 1BE7A9FDD | 223C53CA1 | 2BF040F77 |
| 41 | 1161DE4F5 | 0544F9DB7 | 230847E45 | 322AF4E17 | 26944A0B4 | 3299F1420 | 1C9405B8E | 2DBABD4CE |
| 42 | 33165C531 | 268FE9D9B | 081A94B4 | 39100772B | 27DBF03E9 | 3E3A18AB0 | 13F2D2B83 | 2CEEE5FF4 |
| 43 | 275F97006 | 0A578F2EF | 16CEE7EC8 | 38A5B0084 | 00DC9A1F5 | 1B88CFA3D | 0D8B0B8EF | 29FC4CCF2 |
| 44 | 04BBE4F2C | 1546C3988 | 237105A43 | 339042B36 | 3A5DEBE2B | 1BD09449D | 38EFF588B | 1CDD3A6C0 |
| 45 | 002E32D38 | 1E85D3125 | 3F51120D7 | 00420ED63 | 3384713AF | 1D941BD34 | 2B39EA9CF | 05B6D9E94 |
| 46 | 2B3100F7B | 335ED8268 | 1AC8C8EE4 | 337F17139 | 0672D7995 | 38A54856E | 0124753F2 | 3A3560851 |
| 47 | 046207CE9 | 0FE1BC312 | 09BA5B289 | 39376EF2B | 33F826C2C | 2F6531496 | 3933B8616 | 23125B50F |
| 48 | 3E5849C45 | 01EEDB390 | 141D9A024 | 2DE07E565 | 1813D12BB | 36DB8D404 | 0E8A272AB | 3A66B71AD |
| 49 | 1A2A88A4C | 3F0C9B4DB | 266CFBDF9 | 163420CA5 | 281ABBE99 | 34771C295 | 3AC051848 | 3C53CB875 |
| 50 | 16F795184 | 3466F1FFA | 1F433B456 | 1DDF13810 | 25F58CF69 | 1DD6CFE4E | 10A236FDF | 12AE697ED |
| 51 | 1C8D17F4F | 07C43B7D1 | 1C8DAD395 | 28F6C112E | 3A336ADB3 | 0EB6889AB | 2783A6A1F | 2CDA40458 |
| 52 | 16044624E | 252AA04B2 | 11484E85C | 07F5024B7 | 286E3A67F | 2EE6BACE4 | 277F1F864 | 22F3CF57D |
| 53 | 2D1A3F4CF | 0EEB6DEC1 | 30CD76F42 | 20403D1AC | 3A72FE9D6 | 1DAAF2A39 | 03AB76CE0 | 0A2856267 |
| 54 | 0FA2A786B | 38273EDF2 | 228A45016 | 0309DF52D | 093BDAEDC | 1B11E9300 | 1DA9C5324 | 03565EB1E |
| 55 | 24DCFDC06 | 11CF909D6 | 2FF693F4C | 366338F1F | 22E641569 | 0ACA60D55 | 32D1B009E | 035472E09 |
| 56 | 17F5D6662 | 062FCF913 | 35B211035 | 21ACE73FB | 3B4148706 | 2D0CD106F | 2CAB457A4 | 103E1E49B |
| 57 | 21859E8DA | 2F1E3B3D9 | 1F1014BE2 | 062A3DEB5 | 354C0C786 | 05A8982D4 | 35A758943 | 346EBA72A |
| 58 | 00CB49E5F | 211B1034A | 3A5D2DAF1 | 21D3F3EB0 | 24B2D1150 | 1097C3685 | 2AA3671CE | 0E5DC1308 |
| 59 | 24C8401BE | 217B1F994 | 1FB9664A8 | 3D5057708 | 05A506088 | 1314842B9 | 3C8657064 | 14B1FA77F |

TABLE 4-continued n = 1 (Segment 1):

| q | blk | | | | | | | |
|---|---|---|---|---|---|---|---|---|
| | A | B | C | D | E | F | G | H |
| 60 | 2AD698E2E | 3C129D1F6 | 2C744FF4E | 1C1C052F8 | 18C38A9FE | 252168A10 | 2EB68D098 | 3A001CBD2 |
| 61 | 2AF71324C | 2BF41D408 | 0FC498E18 | 149A1A407 | 0FDC2C4A3 | 19D00C4A1 | 0F6B0DD29 | 268CF8E86 |
| 62 | 19F4D82A5 | 342C73FD5 | 0F5AEEDE7 | 21A2A8953 | 15ADB7A94 | 11DBE038D | 0A5B6634A | 0FA382B77 |
| 63 | 0A5985778 | 35AC3032D | 35691C85D | 2829D55EE | 04A3FBD8C | 2C85BFA8E | 0F459B864 | 3E878F0BC |
| 64 | 10C785EB0 | 054D4CE18 | 1BF657A8E | 101DC64EF | 0B4E3032A | 24ECFD9C2 | 00C98BE0A | 2A1F82444 |
| 65 | 300E8B09C | 31A079FB3 | 0C41DEC5F | 216CCFE4D | 226C5A693 | 3C31A41DD | 3A019974C | 23B64EAFC |
| 66 | 249BDC80F | 0316ED79E | 1E42B5567 | 0CFF04A4B | 310678543 | 34D986980 | 1E3195429 | 280966E65 |
| 67 | 359A72B64 | 186A3999D | 065825DDF | 2D28E6000 | 10964C1E1 | 1468C970E | 34C8B606A | 33CC94DB1 |
| 68 | 370B29C05 | 12841A9E8 | 2147E7160 | 1835345EE | 06DB43F37 | 33854A725 | 065E6614C | 151E2D7B1 |
| 69 | 0EAADDB27 | 004EC6DDD | 30AA39B8B | 2AEB34AD4 | 2A13D6649 | 00EC67B83 | 1176417CE | 0E3683151 |
| 70 | 0832BA87B | 3B67515B9 | 0FD34BC87 | 1688F83CB | 370B52AD5 | 3A2CD6F3F | 3343BF461 | 37BD48546 |
| 71 | 16EA2751C | 1799D9C42 | 24055CEC9 | 226A907D4 | 133C68F80 | 22CA03BF0 | 05F723395 | 2D35008AF |
| 72 | 122A5C67D | 3E46230BC | 09F475BA9 | 15B4B6754 | 11DE75C50 | 28C17544F | 1D85FAB8D | 0D5AD9537 |
| 73 | 1C5497CD9 | 3D405F487 | 05535D737 | 06952087B | 1C4744AF4 | 3E0EF881C | 3CED3D1BB | 1D91157CE |
| 74 | 1D276153D | 14604EA77 | 1661FB979 | 3BAC5E9FB | 089F41406 | 283154122 | 2AFDCE892 | 1FD5E0810 |
| 75 | 2A620F4C2 | 0DE484180 | 2D05E6458 | 3E6D15A27 | 0A92FF0B7 | 2CBF7BF53 | 25A2F28FA | 19A10CE02 |
| 76 | 3A77B1FBE | 2B262F810 | 2BEEA0F46 | 39706BBA2 | 09257163F | 1026D5D74 | 2E2483EBF | 1D6527C1E |
| 77 | 0DC1EBA02 | 383C59C77 | 28C7ED115 | 06FED31D4 | 16F610DC3 | 000890B82 | 2FAD16A3A | 35C9AD95F |
| 78 | 3E5C1EBE2 | 3C65A7691 | 2394005B6 | 251B1BB49 | 1F42BFA23 | 0E8608C07 | 24666F55C | 11A5214DF |
| 79 | 323E882C5 | 2DBFF5E13 | 3638BC43F | 38CC5CBB5 | 1DBF783FB | 0499418C7 | 2285E5A40 | 1A61D17E7 |
| 80 | 1E508F19D | 0CF345F97 | 0E5648601 | 0A0951DF3 | 1194EE717 | 0A6C0B374 | 03C4E19EC | 06F725799 |
| 81 | 0B54F4AEF | 186A12343 | 04C4A60C6 | 27C2CC0E9 | 3973075A1 | 392C5EEB7 | 3933C99B1 | 005F98CB2 |
| 82 | 021B6635A | 3764D0696 | 20942B266 | 0155C4EDD | 3FDBF7497 | 37356D442 | 374F3DB06 | 2718357FE |
| 83 | 120DF6F80 | 0E41F376A | 03544C7B2 | 2D6795EFD | 29E8811F1 | 1B3EFD388 | 01CA4C48D | 2067E8033 |
| 84 | 07703D649 | 35221AB50 | 22141A0D7 | 268061A59 | 2D9192B05 | 3834711FF | 3A07258C0 | 36253B5AA |
| 85 | 1C4A564C1 | 26804247A | 16A4DB29D | 0BEF93C88 | 37A3EAB6C | 25547B136 | 3FC935878 | 250E3BF1C |
| 86 | 17049BB43 | 0D6426761 | 2BF3A471E | 1665820E9 | 14412A13D | 30D5744B0 | 2ECE5CAE6 | 01395189C |
| 87 | 29615B890 | 0A2C5A664 | 216DA64F4 | 3D4AA9D2C | 07B98342C | 2603F0D76 | 0574BDFA8 | 3F9B35D5D |
| 88 | 3A0414B22 | 0A8BE885E | 155C220E4 | 2D3B17AA6 | 3017E1B48 | 26508C6C8 | 3FF25EC63 | 240EFF072 |
| 89 | 2ACD81CE3 | 0468D7943 | 2A4108121 | 1F2E8E67F | 3AB466179 | 33325CA24 | 3006DD3A5 | 1A33F3A2C |
| 90 | 2B038BAF7 | 070660C4E | 30953C7B7 | 3E7375D04 | 1D6A39944 | 00E1BE5C8D | 199A89253 | 0A82087BB |
| 91 | 03BF7C836 | 2CBF9FC48 | 38EAB1C98 | 11C303993 | 3D748807F | 1EBD41D17 | 351085EF2 | 1C55B94D3 |
| 92 | 116E0BE61 | 17BC8C403 | 31BD1EAA2 | 1CF87C049 | 2A41CC04D | 3883EFEC1 | 3971BBBE2 | 190CAE3B7 |
| 93 | 172799BB5 | 3301DB193 | 2480B569B | 34DBEFE9C | 003287827 | 38DAEA1CB | 0B0E25BB4 | 1972B37E3 |
| 94 | 3EF1F9EF4 | 189D8C3E0 | 1941998D3 | 259838BC9 | 28E545988 | 33BFC60D8 | 3572B10F3 | 197913B6B |
| 95 | 24CF96D66 | 285347801 | 22BC70E5E | 394231BC1 | 077583F4E | 0364420AF | 278FBF5CB | 3850AFC8B |
| 96 | 1B38C4A50 | 04439E0B5 | 3A7BEB18B | 3003A36CD | 329D5A2B6 | 1BB123AFA | 049C2CC94 | 0F604D1DC |
| 97 | 28D47EF33 | 24CF66B6B | 24B716FA9 | 34ED7F6BB | 186AE44B4 | 1380D0726 | 1CC51324E | 16BA74F62 |
| 98 | 04422E60A | 3424BA16C | 3FF1B39DD | 1A1E658F7 | 33457317D | 14E822151 | 3EC02F279 | 28593D11D |
| 99 | 0F2DF0912 | 21BBFA838 | 32D634EBF | 2061148FD | 09A565B74 | 2BCE430B7 | 34DAAD9FA | 228ADAFE5 |
| 100 | 2D7EE0544 | 25D57B7CA | 0FADAF20D | 19B4F6444 | 3A75DF1C1 | 0AD38DD56 | 0A4D61EEA | 28C1262A5 |
| 101 | 1B6AEE253 | 0BFE02772 | 24AB19547 | 186A377A5 | 03089B4E8 | 128955F60 | 3A8DA9AC8 | 2931648B3 |
| 102 | 21BE0200F | 00F34B4F5 | 34FF3261B | 1A0E27AED | 0A821AEFB | 21B0BA404 | 1C6A644A4 | 1734EBB33 |
| 103 | 201FBFD73 | 0592E9D86 | 053D87C9D | 3CAFC7479 | 22F1BA3FA | 3DB25DD15 | 31D468990 | 22FF2B539 |
| 104 | 06C77404E | 18AE64252 | 3963D899A | 37179C03C | 0FD2E3D04 | 191E64DBB | 380B841FB | 368E1DEAA |
| 105 | 3A561759B | 156243DE8 | 04325D217 | 33993D0B0 | 0CEAC2109 | 002242D1B | 33C1D9F5E | 1EC4195D3 |
| 106 | 17D7A9B74 | 1F44ABA75 | 17B572FE3 | 096008B9B | 1F1E00AAE | 05489F7A1 | 17A4C131D | 1C018E923 |
| 107 | 0A4ACCEC8 | 1F294A30D | 19CAEE64E | 002787A1B | 03EB3238D | 27C10F626 | 1C9E656A0 | 3F73609F0 |
| 108 | 1E0E3C802 | 1B52D12AA | 2F4E003B7 | 23BA7A6F1 | 3CAA0998A | 32E96C916 | 168EFA1EE | 28147EE33 |
| 109 | 1CEC9799E | 215D9302B | 176BB6639 | 003D5E371 | 12FE4ADB3 | 3106B64E2 | 001D9C28E | 0F39059DC |
| 110 | 31570792D | 2260D7FEF | 1AC830374 | 118FE7579 | 08F982159 | 23BB2B13A | 2C7944305 | 376396F3C |
| 111 | 2D340540B | 272E94D06 | 097C70995 | 0E70DDADA | 1DBD644E5 | 341A72A58 | 01CBF5334 | 2C7999AF9 |
| 112 | 3FF17764D | 0701DFAD3 | 146BDBB97 | 229D2D7F0 | 03C5DA21D | 3A5916EC7 | 2390AC01D | 197D64233 |
| 113 | 3E9759D5A | 00B237425 | 0B7E646B9 | 190CB4D16 | 2646AA1D4 | 1A373103D | 337E5EFB1 | 0199DE4A1 |
| 114 | 3FD5ADE8A | 26B843860 | 0A2D0AA7B | 3C351E07F | 1B25376AE | 05C553CDD | 1DBC3F38D | 019823A2A |
| 115 | 30FF187B4 | 112F9D7A1 | 1AE977517 | 3760AF555 | 004F86368 | 3700975C2 | 0518029DE | 032427D9B |
| 116 | 3A86D49BB | 057E649D8 | 2FDE33D7E | 31254217C | 30E05CE12 | 10BCC1CD7 | 1889C5139 | 38A163ECF |
| 117 | 2610F5174 | 02A7ACB27 | 208B84FF0 | 14609CA80 | 0F3526318 | 38EBC7384 | 287C57BAA | 279661A9C |
| 118 | 014F6D77B | 1036B3D2C | 294F1999A | 33A059187 | 26CCE0507 | 180DF3129 | 00A6CAE22 | 2AC0F23A2 |
| 119 | 347C62997 | 1912A710D | 2260C531F | 2F54BBEBB | 0A2D90305 | 1BBEE20E4 | 0AF79997E | 2376F3D0F |
| 120 | 04484EB82 | 181977944 | 1C1CC2693 | 227ECAB0F | 23F32982B | 19E2F290C | 1BA2300F8 | 0EFB06247 |
| 121 | 0EC048AD8 | 3B2168495 | 34FC02DA1 | 2C0CDEF52 | 0553CA222 | 25DFA4581 | 29CF66B6B | 0AB9C21CD |
| 122 | 2AF502148 | 3B00632F9 | 387CDC4BF | 3F8B9F716 | 19084CD65 | 0354918C7 | 39D1FD9AA | 0F5ABDB77 |
| 123 | 2C6E2557A | 3E8A19D6B | 3E6756A28 | 237E6E5BF | 24CA57004 | 1D52401AD | 0237F1D80 | 0FB2B335D |
| 124 | 228F4B540 | 07532BF5D | 101F67F52 | 29D8598EE | 0421A0E23 | 2D89C2AFF | 0963D2F3B | 24C472A63 |
| 125 | 0CF3598E8 | 196A40BD2 | 00E63B26D | 088A0BFCA | 1C78E9016 | 03835236C | 33071A836 | 3949DC586 |
| 126 | 3E815D747 | 1588D4E96 | 073C8D44A | 303281AE4 | 095D31EC8 | 1F10F69DC | 200F057D8 | 1F270128F |
| 127 | 34F9ACB6B | 384870FF1 | 257A863DE | 34B36BA0F | 3FA3D216B | 27425041B | 0E0DD0BAD | 2E95AD35D |

TABLE 5

| | | | | | n = 2 (Segment 2): | | | | |
|---|---|---|---|---|---|---|---|---|---|
| | | | | | blk | | | | |
| q | A | B | C | D | E | F | G | H |
|---|---|---|---|---|---|---|---|---|
| 0 | 13F99E8EC | 3CF776C2A | 3300A482C | 0B2BF4791 | 17BECDFE8 | 35998C6D4 | 05F8CB75C | 259B90F0B |
| 1 | 116913829 | 05188F2A4 | 2DB0A8D00 | 2F770FE4A | 185BE5E33 | 0F039A076 | 212F3F82C | 116635F29 |
| 2 | 004EE1EC6 | 18EF4FDD9 | 26C80900E | 1A63FB8A7 | 1DAA917D4 | 0E6716114 | 02690646D | 0CC94AD36 |
| 3 | 06D4FF377 | 2716E8A54 | 16A1720C8 | 08750246F | 393045CCB | 1DBCCDE43 | 114A0CAD6 | 181690377 |
| 4 | 3DC4EF347 | 1F53452FC | 01584B5D3 | 11D96034F | 1FA62568E | 11974FACA | 191BE154D | 397C9D440 |
| 5 | 05A1B6650 | 29835ADAD | 2F6DDABE4 | 0976A607B | 11BA92926 | 2456B1943 | 3E3FD608B | 095E7584B |
| 6 | 00CC66282 | 0560BE767 | 21EBAA7C6 | 2D8E9ACE3 | 198A9E285 | 05F3E73DD | 13DA751A2 | 176B75E43 |
| 7 | 03D08ADC1 | 2254606FC | 3C695D892 | 1DA9E0280 | 2CD4FF589 | 19B78A5A4 | 0CE67A7C6 | 12535A61C |
| 8 | 0984647CF | 0822BA46B | 3EB2BC076 | 212596F54 | 11CC2E64E | 120BADF9F | 0DA72CEDE | 30D0E106F |
| 9 | 083CE5726 | 1F05DA925 | 169D93EF6 | 1FCADF3D3 | 08A5CF0BC | 317C8508F | 19BDCCFE7 | 0FACE3631 |
| 10 | 27583A466 | 1CB1634D5 | 03C7849F7 | 38C6CED00 | 1161C173A | 15A645D3E | 281A7ED92 | 076ADA797 |
| 11 | 33BA1AE8F | 187F578EE | 32473D69A | 2458B703B | 267E59071 | 0F317883B | 3E7DEDBF1 | 3B9859BA7 |
| 12 | 0322609A3 | 20C4C957C | 3FD638746 | 3FB716D79 | 36BD0CF1C | 333B11B8F | 0027ED1F2 | 3E7471BF3 |
| 13 | 3529922B1 | 0ECECBE04 | 1980B9B9E | 38D60363F | 18904BCED | 108E3E5F1 | 34B95C446 | 338F51DAC |
| 14 | 21FD50527 | 0EA2F7A31 | 1E294A159 | 114734A02 | 120B90BF3 | 3F3617C92 | 0129071E2 | 106640936 |
| 15 | 2B59354BB | 275BF9761 | 39C6FF332 | 2004B3902 | 053F9DCB0 | 19D79A902 | 2B3125038 | 20649B43E |
| 16 | 03A8A7A2B | 091AE6721 | 18651FD9E | 1F5415ECD | 1B38A62E | 07FB0F422 | 3EB58896B | 077FE4C7C |
| 17 | 06A13CB38 | 340099B18 | 2AE6D6385 | 1669631F9 | 28E51A676 | 19A023391 | 261855F39 | 3E518F0BC |
| 18 | 2A88F831B | 09D295831 | 294C468DF | 1477F0A13 | 37725C6EB | 00E7DB222 | 27D610157 | 349A8FAB6 |
| 19 | 163E1C44D | 3F98B6F4A | 1805538DD | 01EE3DB4A | 22AA1797E | 27568753E | 16090F219 | 2C9838C01 |
| 20 | 34B0543DC | 121B8EA82 | 00873B4A0 | 220FE7C05 | 2EDBEAE34 | 1104BDB93 | 0711E8C0E | 0E1C107BD |
| 21 | 226183AFF | 15643DE71 | 04A4CDECB | 2E67FDF8A | 26D2A6D40 | 25E7695F1 | 1A99778F5 | 20FE0C1A3 |
| 22 | 0F7EAC09D | 12BB72B2A | 182E44301 | 2962EB85A | 3477C1B69 | 3E3CF56F7 | 29C9D00C6 | 39788600C |
| 23 | 31084BEB5 | 1DC90E345 | 391736CC1 | 3C8292AE1 | 38A0D515C | 3977012F6 | 25D1F6055 | 36A7D3F8B |
| 24 | 229D3ABAC | 1044BA05F | 0C391B88A | 0636A90A6 | 0B14322AB | 21ADC33E4 | 2DC1A3BFE | 0D7FF6D1F |
| 25 | 33C85B393 | 37BFA31B6 | 134F872F0 | 0C5EA36E1 | 286956ED1 | 1632092FA | 382B4BB10 | 23DC3EF14 |
| 26 | 38E8B09BF6 | 0A0CE666B | 207D9804 | 23FF360AD | 121BFDA4E | 347D442FD | 242922C07 | 23C6E4115 |
| 27 | 263EA8516 | 36138BD6A | 0ED9C55E7 | 3F0937876 | 03232BC24 | 18E5FFF26 | 3530CF206 | 3981B7414 |
| 28 | 1D9AC2E79 | 051B220E9 | 3F3B09EC8 | 0D3F6C366 | 0201A7CB9 | 3D5477092 | 22185FF9F | 1C5AA5348 |
| 29 | 208D85694 | 22104E7C5 | 14BCFD3DD | 3592DF665 | 1F4EC3265 | 24358076A | 2D20A8000 | 017F2D489 |
| 30 | 36B3A9A2C | 3F8E0F162 | 13ACDCCF2 | 16951F727 | 271E73555 | 1B3EDCDE7 | 162B45352 | 1CAFA635A |
| 31 | 2D30FE705 | 3EC9BFC8D | 1B10F8349 | 34F973F31 | 1CA96A349 | 1A28B4543 | 1C5367CE6 | 2DFAB0AE7 |
| 32 | 21D93EB5A | 0E49D6211 | 3C6FCF774 | 09F44CACF | 2D8CD2BEA | 037DDAD3D | 3BBD06D1D | 39CBB996F |
| 33 | 159B1F948 | 0183E8DCD | 3A484866C | 21F8DF1A5 | 219A58193 | 2D1B3C399 | 2275F19BA | 0EFF4C612 |
| 34 | 22EB93A82 | 15047E272 | 15428D77B | 38FFC612E | 20609BE54 | 3226C8254 | 3E5568DB2 | 159284EED |
| 35 | 34529707C | 2E84585F4 | 20DFFB4C5 | 28288AA00 | 10EFC1E07 | 3C4D211FC | 379087C3F | 25716A7DD |
| 36 | 20106354F | 22AEB9FD7 | 3A6BAC67D | 3126294C6 | 0FBC874AC | 2DFE5675A | 391B1DDAA | 06BAA74D8 |
| 37 | 348F831C5 | 2E44BF3C2 | 3D9F6F454 | 20746A30E | 08D183029 | 35C6BFEA7 | 2729B552B | 263BB2EBD |
| 38 | 202D7F08F | 0DBE1C144 | 132F4EC09 | 184CD9B93 | 2596F5884 | 2A55B8217 | 2BEAE02D8 | 235A19A43 |
| 39 | 2DDE3FF5F | 23932555C | 001ED92D7 | 22FCD3D60 | 2C0737593 | 0B27E62FF | 0693CFBDC | 284D5B33F |
| 40 | 1DB9AB8E9 | 2995EE0A1 | 1ACFE9892 | 0D41BCB9D | 2E3806507 | 25CCD5D60 | 3536BF04C | 0BB0A5E3B |
| 41 | 3FFD4DD82 | 3E69CC1C1 | 2BC30FB74 | 3462F70FC | 164FAE762 | 09B83F8AD | 1DF593F3C | 2DB478034 |
| 42 | 16E24E9B6 | 0A9FCFBD2 | 3A018544C | 1ED8E2855 | 0037681E4 | 05950E1F8 | 1107DA097 | 377A25C65 |
| 43 | 03C9318B8 | 0C70A7749 | 0D58708C2 | 0CA2808C4 | 219E02554 | 39315B2F2 | 2E089B00F | 302E135C7 |
| 44 | 04DC211E8 | 1DD20A505 | 21A50649F | 2CA438C04 | 39CAD66AE | 2E1BD969F | 002748760 | 069924211 |
| 45 | 2E84BCF09 | 226F5D43C | 37BE7EB10 | 07CDC854A | 06FB50D48 | 08966435B | 01BA5E5D2 | 1D34057FA |
| 46 | 2D8DFD565 | 0A30D633F | 33F93B7C6 | 0B330E9D2 | 0E659B262 | 130669024 | 19A9D5F64 | 38059132D |
| 47 | 17E4777AE | 1308F9046 | 2F7C0483E | 1859E0943 | 0982C9101 | 05453D92C | 001F53877 | 388A571AB |
| 48 | 00D29CC63 | 0A6D3BDED | 1CA44D2AF | 388C002CA | 2A3D70EF7 | 2DD3F5A6F | 39FEAF0B6 | 11DFE385F |
| 49 | 3E3A6CEC4 | 122F5E8BE | 360B96301 | 0632CF244 | 2E8985A9F | 0FD256C87 | 0449C29D4 | 26B713C90 |
| 50 | 238150687 | 3D96F7F7B | 0091E6D18 | 21802352A | 02F7A466E | 0A5BB6648 | 350DA85DB | 1C97F4544 |
| 51 | 306BA76DE | 379A88697 | 3F0DA31E1 | 0EBF48C71 | 27F8A46EB | 3F75A19F6 | 277002F97 | 275B43715 |
| 52 | 24D946CC1 | 38DF102DC | 3EFE1F5B3 | 3C316E148 | 2735B20CF | 0688E430F | 0316DC923 | 24919BEA1 |
| 53 | 0EEAF72D2 | 3C7248573 | 1087A7BD6 | 08EDA9BF6 | 2B5D97BF4 | 26733DC60 | 1190D275B | 2EC7ABD30 |
| 54 | 37C6AB63E | 2FFC9C790 | 02CAA37A7 | 1B34A3F84 | 0022CD5F6 | 3ECF891BF | 193D545E2 | 0172C674E |
| 55 | 0848A41C3 | 1D8150EE7 | 3D8A8549A | 2595F707B | 00640B276 | 2D44EBDAE | 1CAF37453 | 377EF590A |
| 56 | 16B7A5F7D | 1F5AA7998 | 382300A8B | 218916E53 | 19D00E728 | 1EDA11790 | 0BBDEF9C4 | 1DEB15796 |
| 57 | 3EFB3368D | 392AA88AD | 29CF3CACD | 03F59ED8A | 1042098CA | 1721B8F3A | 2B5DE9312 | 0CB5E6F23 |
| 58 | 1A8B0FB9E | 3FBC09C8B | 3D7F3E248 | 034C9BCB5 | 1BDD89300 | 3392476C0 | 0C10AED4B | 23BECA42A |
| 59 | 0EBC749B6 | 33453C7F6 | 304735F5C | 334628143 | 1DAF6E7A9 | 11BB9C393 | 226C5E4FF | 170372039 |
| 60 | 3F9262DBC | 0693308C8 | 21B563415 | 09BDCC403 | 0112C79D4 | 2DA9F1134 | 36AA1CD7D | 3A1608BFC |
| 61 | 218AC590E | 0FACC734D | 02132C9A3 | 27087557E | 076B3ECE7 | 2EA16BA3D | 0E1D452F1 | 3F70B027A |
| 62 | 004F9DC68 | 25BE3AD9C | 2CBD3C07B | 3F9DECD71 | 3E771E15A | 11FF2F24D | 2AEA5DF67 | 1E838955D |
| 63 | 3A04BC376 | 1D19254F1 | 00F92DD2B | 3C57484F3 | 181D0973E | 319F9CEEA | 053ADEEDB | 1A3C22150 |
| 64 | 0F78BA6BC | 2DFE0E681 | 3035BD77D | 0A0FFD148 | 275F50C66 | 2246B9053 | 27B2BF3E9 | 1741894F8 |
| 65 | 1ACCD0F79 | 22F0AEA4F | 32796ADB5 | 134A4A876 | 183D989E3 | 204C4BF97 | 22300E86F | 3F18744A3 |
| 66 | 3EB6E19EF | 1B24EAB88 | 2E318F810 | 3F07B618E | 26B4C0C87 | 31CC10EA8 | 169E1B650 | 017DF88ED |
| 67 | 2BD9E8FED | 0AB104122 | 30C9D81A0 | 09EA73C7F | 141357B1D | 000A7DB48 | 1DD06FD41 | 0AFA8EF72 |
| 68 | 19CA5678F | 28A89AA43 | 1DB945917 | 262AF69C3 | 3145A4473 | 3742DBFF5 | 1BCD965E9 | 1B0E7FC84 |
| 69 | 077838B25 | 2BF7032F8 | 23DC2E014 | 028544277 | 37B411B5F | 392FF6CDC | 1D66F2BE9 | 011372DA0 |
| 70 | 39596216C | 05A651F63 | 183A6AE26 | 0D1FCA203 | 0FF6F0D22 | 2FEB8364B | 05A438ED8 | 32D045F13 |
| 71 | 3711AD513 | 290B237FF | 20E2A9B26 | 0C72A0234 | 2F1ABBE93 | 19B505378 | 354ED915D | 0C359F272 |
| 72 | 1D7786BA4 | 1CCDF053A | 36828B333 | 0ED27AFB6 | 241326FC4 | 1A9C37F8B | 0A9C3C372 | 05937E898 |
| 73 | 1053B9CDB | 040B97B1D | 0D4FF481D | 23AD465A8 | 2906EBDE2 | 0C4F6C09D | 2189C5FEA | 2D90D305A |

TABLE 5-continued n = 2 (Segment 2):

| q | \multicolumn{8}{c}{blk} | | | | | | | |
| --- | --- | --- | --- | --- | --- | --- | --- | --- |
| | A | B | C | D | E | F | G | H |
| 74 | 39073122B | 35FEAA236 | 1B38B7A90 | 2E02AB9F7 | 219FEEA0A | 36B3B2EF8 | 39A3F4C8B | 15A42C9DD |
| 75 | 2C6326A9E | 33F7536C1 | 2A120C75F | 37030CAA0 | 3A011882C | 098C8504E | 3B92D756B | 175811CF9 |
| 76 | 38A0F736B | 2BD9E9C32 | 3B989715A | 2A646ADF4 | 2D02FE38C | 11AC7E9E6 | 3F5464862 | 0F382B0D8 |
| 77 | 26897D80C | 145B21D3E | 143F5E320 | 30549707E | 28126710C | 122CA92BE | 3AF47270C | 0B544128F |
| 78 | 00E931208 | 2E1E75EAA | 374C36E5F | 21724DFC5 | 1DFCD2028 | 1B3FF774E | 3A826A68B | 1781CDCA4 |
| 79 | 0C3D7268D | 0B7A26BF9 | 1587CE5CD | 1D04E1E60 | 36240C07D | 1AC403449 | 0417F9622 | 02B9F8BED |
| 80 | 1B569F488 | 08A3F3A46 | 377F03A18 | 2DE416045 | 1ED96E381 | 33F4F16DC | 2C8DAAE4F | 33E384AC7 |
| 81 | 13F709786 | 02A4E32CB | 14C7F849E | 09EA16987 | 06C849EA4 | 219E4B995 | 243CB7F07 | 253513BC6 |
| 82 | 09B83FDF2 | 119D60439 | 278290BFF | 2483E6F2C | 0EDEC175D | 242A669C1 | 3EB639EF0 | 31EBB4CA0 |
| 83 | 22CAEF0E4 | 0B2FCDED0 | 19BA79607 | 343F81C7B | 289AA213E | 358AC9FFA | 23956ADA1 | 00BC725E7 |
| 84 | 1186F95E3 | 2F95F4048 | 3CFBF41E2 | 1D1E4BE96 | 26B38BA65 | 2F715E590 | 2235C0029 | 2C89AF93F |
| 85 | 33437ED6C | 12F14DB69 | 2E70F5611 | 183752704 | 142BC8B34 | 3B90ECD86 | 1C11EB493 | 1022D4782 |
| 86 | 248457F60 | 05B9A28A5 | 0A2A5DD56 | 16002D9E7 | 34C87FB16 | 2E32BAE0C | 21065BD64 | 1CCE92BB0 |
| 87 | 1DCE3941A | 1D940ACE3 | 30D331B98 | 3D5A3BAB6 | 119791607 | 10FB0D788 | 2C78E9015 | 100B598E4 |
| 88 | 39C0BC811 | 1B886594E | 27AF50C73 | 2DCEA05E6 | 0805EDCA9 | 3A5989B08 | 18AD24255 | 1683B7CF2 |
| 89 | 186A3D233 | 09E8B95DA | 1ED9F3DBE | 1B19A74F8 | 356CA7443 | 316C9FBE9 | 3F8A3162A | 3A0BC11CC |
| 90 | 02F039B63 | 2F02D3E75 | 0F5B5E89E | 3D062255C | 222C6AA4E | 25DEA06FB | 39488C071 | 139318BFB |
| 91 | 27B5B6EE8 | 22154E0BD | 3FF7729F1 | 1052B1947 | 3D477BF2B | 3EDB6745A | 1B30CF849 | 030F84AF4 |
| 92 | 27B2D40BC | 01EE5E9B6 | 24B0ACF84 | 3370F65E0 | 067D8DFA9 | 1C01B9327 | 26FF8FDB5 | 3809C0CA6 |
| 93 | 11F581193 | 07B9B7A7D | 1CA56B4A3 | 3D088CC6C | 11D52C38A | 344760F0A | 3D3AA336D | 0118CBD93 |
| 94 | 096990784 | 2960D1672 | 3BFD7D847 | 2BC297EEE | 32168CF28 | 3912FFF6C | 08ED9BAB1 | 34452C6E5 |
| 95 | 02CD48DC2 | 186403849 | 24C6EE1EA | 12ED5268A | 2718C00E9 | 27E8F18CF | 145913E2D | 0B09009BB |
| 96 | 06B97DD08 | 2880C9B96 | 37EB87E03 | 14C4ED01D | 17041E5DC | 347A412CB | 088CE591B | 0BE926B22 |
| 97 | 116250DF7 | 1745B4329 | 1102B7093 | 1CA549C5A | 25244AB6C | 374E0F19B | 274F76015 | 0FB738F16 |
| 98 | 12841B9E9 | 1F9C4AEEB | 1445F0C98 | 39FFB6307 | 02AB688E7 | 0FD8B499E | 28D533072 | 138F162EA |
| 99 | 22BD9525E | 2030E58C6 | 25F2CD033 | 157D93437 | 1442E92D2 | 3D6EE9DF3 | 3CA5B469D | 0588A0FAE |
| 100 | 0FDEC177D | 2606157BE | 2224E556C | 0C6F33897 | 0F830DE1B | 3C3F9C1D8 | 2AF576923 | 0D4173E27 |
| 101 | 376EF82C2 | 30E3C582E | 0A82DE29A | 1B8D454D9 | 079ACE6D9 | 2579984C6 | 392F28400 | 24CEAEDF1 |
| 102 | 1CD4AA9D2 | 1DD6F4DA5 | 3485B7150 | 105DE02F9 | 22168E0FA | 24F48AA6C | 003771A39 | 306890843 |
| 103 | 1F8303786 | 2C981AAE4 | 0819F22E9 | 0A1D88D55 | 3B4C012FD | 0214CDF52 | 19DF3BE8F | 02364E19A |
| 104 | 1364A15C0 | 16E9F9961 | 17E598810 | 2654E5A2C | 09B43C7C8 | 3A5E2AF45 | 14FC71E26 | 2B4BA69F4 |
| 105 | 12E128BEF | 19166342E | 04A1404B7 | 283D17B66 | 014836F64 | 13BE0B4B5 | 2F8583C08 | 2B19A7FB4 |
| 106 | 19F83FDE2 | 361D25170 | 36354011B | 3FF4EC74B | 1B2128FF9 | 0C849EB1B | 096B991D8 | 1CA7A74AA |
| 107 | 32E0BEF35 | 11A61714D | 34C56D40B | 0742C52FE | 00ED2F1C4 | 3997FC7B7 | 06E414374 | 180DCD64F |
| 108 | 18399ED59 | 224E6C2FF | 3450F1BB7 | 27A1CA959 | 21B5E00F8 | 13B67DAE8 | 0B14C022E | 0E41BBEE2 |
| 109 | 318D94D05 | 2EBB53B17 | 331C3E6F4 | 0FBCD71ED | 380FF18B8 | 3E3C75B26 | 0E0088A18 | 17553D2A2 |
| 110 | 37AC7E5D5 | 27C9EADFA | 3FC47B5E4 | 38699BB57 | 1564F8B27 | 3579C7FEB | 13401BD88 | 0DB519DE0 |
| 111 | 0FF4D6F22 | 3C84242F3 | 2DEAE40AD | 305F320A5 | 244CB97B0 | 0892DA905 | 3F09D5CB5 | 332E7DB02 |
| 112 | 31479E580 | 1B6AD13E0 | 16A1CF9E2 | 33A0A119A | 1AC8388E9 | 3D4105F37 | 226501835 | 27AF1310F |
| 113 | 1CBDAFE39 | 3E5A30C1C | 236E9A029 | 063430D97 | 0CD91A825 | 02F335D7E | 1989FE0BE | 13C4E2A20 |
| 114 | 10B393370 | 33CB79316 | 2CEB44FC0 | 236019420 | 248F95ACB | 35034B6F0 | 365691771 | 34A8FBCB6 |
| 115 | 25463FC5F | 082FC0ED2 | 038ACE1CC | 3E959B49D | 21B8C04F5 | 08633F3A0 | 3A5D18159 | 12B3EC4C7 |
| 116 | 167B32C3E | 06FF88387 | 34C3F468B | 3239005B2 | 121C913AF | 21C90CE16 | 28B54D557 | 3811CB0A9 |
| 117 | 221BD0503 | 0AF619499 | 21FB04C01 | 1B3DA7AEE | 3FA2E3B95 | 348466C50 | 10F12A28D | 0E70B26AB |
| 118 | 1D79A57C5 | 315D2460F | 1402B8222 | 28DC66FEA | 1BCF748F9 | 2AD5D4227 | 0094D2CAD | 25EA22A58 |
| 119 | 062B39CFB | 310E8818D | 0F2D0A235 | 3F6468866 | 33F86F342 | 39CAB5BBC | 2E7D6A8BF | 3E9218162 |
| 120 | 2FCDEA0E0 | 1BDD766A4 | 2827B99BB | 0B5F04CC9 | 1C9E02A9A | 1A6675ED4 | 033497A06 | 07D4ADD44 |
| 121 | 3CD46CD9D | 311A64A85 | 24DDFE6FF | 3411C6FE5 | 0D0613CDA | 0E9276056 | 178ACC4F8 | 23DEA3CB0 |
| 122 | 2762D6A40 | 306FE3843 | 1402589C8 | 382B07654 | 160BA3DEA | 3815B54C8 | 273960105 | 2076A15E5 |
| 123 | 1C593A744 | 1562487F6 | 0C38617B4 | 2CA68266A | 071C4BF93 | 2593F0BDC | 1562436E5 | 199BEEA49 |
| 124 | 35B8C7503 | 278F57EAA | 34A804061 | 19C657A74 | 385734710 | 3FAC27628 | 0707BED4E | 32F20F45E |
| 125 | 34994C46C | 1C6B99499 | 1AF24D850 | 11AD795D3 | 19288BFE9 | 1360C1B96 | 3B5D8DBC0 | 2554E72D6 |
| 126 | 22D7095A4 | 34B70502A | 3F0CB27D2 | 04FC214E6 | 24C0B80C5 | 03D6F4DC8 | 1432A099E | 26300D70E |
| 127 | 21C33416F | 18B894695 | 3AC062614 | 3537CF601 | 00A20A8B8 | 1CD10BAF5 | 394DF1DC0 | 0925851ED |

As mentioned in the foregoing description, the SA-preamble received from an ABS (advanced base station) is used to obtain a cell identity. In particular, an AMS (advanced mobile station) compares auto correlation or cross correlation of an SA-preamble sequence received from an ABS to auto correlation or cross correlation of the SA=preamble sequence shown in Tables 3 to 5 and then detects a matched sequence. Yet, since a sequence of a sequence index X lies in a complex conjugate relation with a sequence of a sequence index (X+128), in case of determining whether a sequence of a sequence index 0 matches the received SA-preamble sequence using the auto or cross correlation, it is able to determine whether the sequence of the sequence index 128 matches the received SA-preamble sequence without using the auto or cross correlation. So to speak, without calculating the auto or cross correlation for an SA-preamble sequence corresponding to every cell identity, it is able to detect a cell identity by performing a procedure for calculating the auto or cross correlation on a half of an SA-preamble sequence only. Consequently, the mobile station obtains a segment ID n and a sequence index q value from the matched SA-preamble sequence and then determines a cell identity according to Formula 3.

Although auto or cross correlation of a complex-conjugated sequence is not used, if all of the SA-preamble sequences shown in Tables 3 to 5 are compared to the SA-preamble sequence received from the ABS, it becomes an overhead in viewpoint of the mobile station. Moreover, in order for the AMS to make a handover away from a serving ABS into a target ABS, since the AMS should be aware whether the target ABS is accessible as a public ABS, the AMS has to be aware that the target ABS is one of a macro ABS, a macro hot-zone ABS, a relay ABS and an OSG (open subcarrier group) femto ABS despite that the target ABS is the public ABS. If the target ABS is a private ABS, the AMS has to be aware that the target ABS is one of a CSG-close ABS and a CSG-open ABS.

Therefore, all of the SA-preamble sequences shown in Tables 3 to 5 need to be partitioned according to an ABS type. The AMS recognizes a type of the target ABS, compares SA-preamble sequences of a specific partition to a received SA-preamble sequence only, and is then able to obtain a cell identity.

In particular, 256 SA-preamble sequences per segment, i.e., total 768 SA-preamble sequences (or cell identities) are partitioned according to an ABS type. In this case, since the AMS is aware of a type of the ABS to access in advance, the AMS detects a matched sequence by comparing a received SA-preamble sequence to the SA-preamble sequences existing within the specific partition and then determines a cell identity using the detected sequence.

Figure 8:
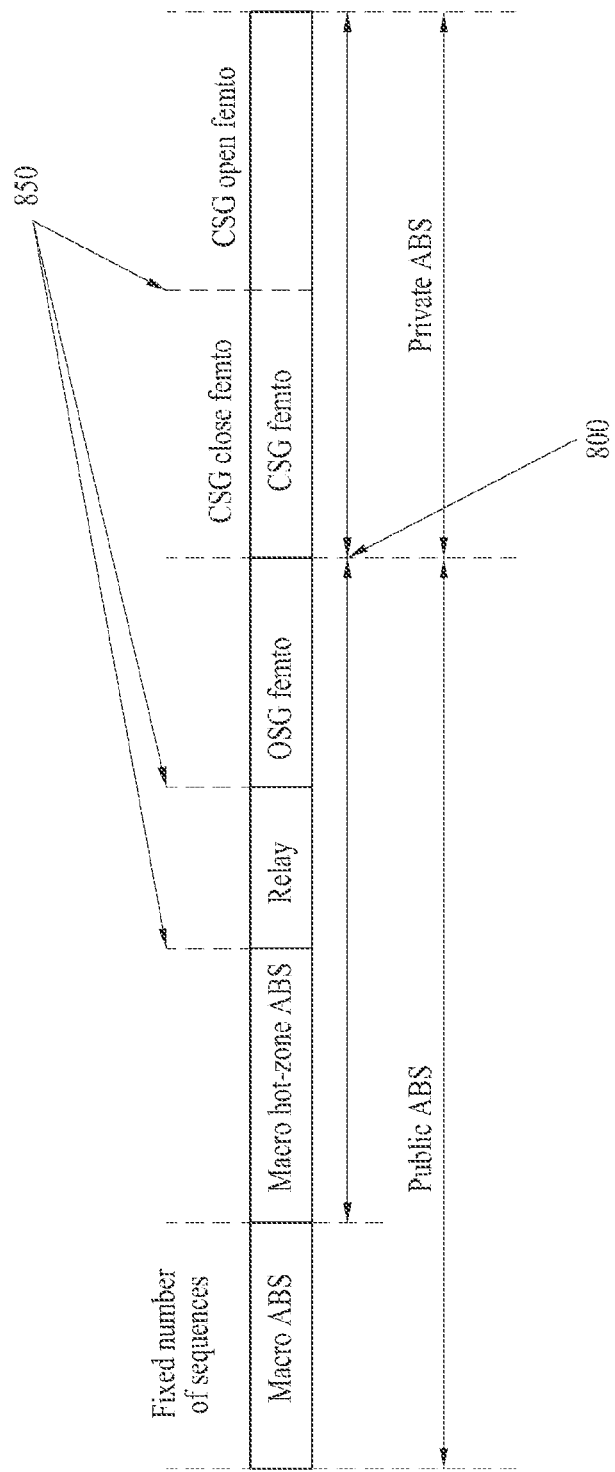
FIG. 8 is a diagram for explaining an SA-preamble partitioning scheme according to an embodiment of the present invention.

FIG. 8 is a diagram for explaining an SA-preamble partitioning scheme according to an embodiment of the present invention.

Referring to FIG. 8, the SA-preamble sequences shown in Tables 3 to 5 or cell identities corresponding to the SA-preamble sequences are partitioned into a plurality of subsets. And, each of a plurality of the subsets is dedicated to a specific ABS type to use. This SA-preamble sequence partitioning is flexibly changeable according to a situation of a service provider. And, this partitioning information needs to be transmitted as a minimum overhead to an AMS.

First of all, assuming that the number of the SA-preamble sequences or cell identities for a macro ABS is fixed, the SA-preamble sequence partitioning can be divided into the following two steps.

According to a first step, SA-preamble sequences are partitioned into SA-preamble sequences (or cell identities) for a public ABS and SA-preamble sequences (or cell identities) for a private ABS, e.g., a CSG (closed subcarrier group) femto ABS. According to the first step partitioning, it is able to provide information indicating whether every AMS is accessible to a target ABS.

According to a second step, SA-preamble sequence partitioning for public ABS can be performed in detail according to such a type of the public ABS as a macro hot-zone ABS, a relay ABS, an OSG (open subcarrier group) femto ABS and the like. Likewise, the SA-preamble sequence partitioning for the private ABS can be performed in detail according to such a type of the private ABS as a CSG-close ABS and a CSG-open ABS.

The first step partitioning step is explained in detail as follows.

First of all, assuming that the number of SA-preamble sequences (or cell identities) for a macron ABS of the public ABS is fixed to X per segment, a target ABS is able to provide an AMS with information indicating that x to z of 'q', which is the information on a first step partitioning, corresponds to the rest of public ABSs except the macro ABS and that z to 255 correspond to CSG (closed subscriber group) femto ABS.

The target ABS of the present invention broadcasts information on a boundary point z between an SA-preamble sequence (or a cell identity) for a public ABS and an SA-preamble sequence (or a cell identity) for a private ABS in Tables 3 to 5 to the AMS using 4-bit information included in S-SFH SP3 (secondary-super frame header subpacket 3). In this case, the 4-bit information means a SA-Preamble sequence soft partitioning information field of the S-SFH SP3.

A value of the z broadcasted via the S-SFH SP3 (i.e., a boundary point indicating which SA-preamble sequence (or a cell identity) is a last sequence for the public ABS) can be announced. In this case, a granularity of a range for the boundary point to be located can be determined according to the number of SA-preamble sequences corresponding to the pre-occupied macro ABS of the public ABS. when the number of total SA-preamble sequences or cell identities is 768, if the SA-preamble sequences are partitioned into 3 segment sets (Reuse-3), 256 SA-preamble sequences or cell identities exist per segment.

Meanwhile, regarding cell identities and SA-preamble sequences, one cell identity corresponds to one SA-preamble sequence, as shown in Formula 3, and an adjacent cell identity corresponds to another SA-preamble sequence in complex conjugate relation with the one SA-preamble sequence. For instance, adjacent cell identities 0 and 1 correspond to SA-preamble sequence indexes (q) 0 and 128, respectively. Adjacent cell identities 2 and 3 correspond to SA-preamble sequence indexes (q) 1 and 129, respectively. And, adjacent cell identities 254 and 255 correspond to SA-preamble sequence indexes (q) 127 and 255, respectively.

Preferably, in order to reduce sequence detection complexity, the AMS pairs an SA-preamble mother sequence with an SA-preamble sequence in complex conjugate relation with the SA-preamble mother sequence and then compares the received SA-preamble sequence with the pair. Hence, a partitioned SA-preamble sequence is preferably set to a granularity within a range of a multiple of 6 (3*2) in total 768 sequences. In particular, the granularity has to be set within a range of a multiple of 2 in 256 sequences with reference to each segment. Moreover, since partitioning of sequential numbers is one of methods for reducing complexity, partitioning is preferably performed with reference to a cell identity in the following description.

For clarity and convenience, the present invention assumes that total 258 SA-preamble sequences or cell identities for macro ABS of public ABS (i.e., 86 macro ABS per segment, where 258/3=86) are occupied. Therefore, the number of SA-preamble sequences or cell identities for the rest of ABS except the macro ABS amounts to 510 (=768−258). It is then able to indicate a boundary point position by setting a specific granularity range to the number of the SA-preamble sequences or cell identities.

If the boundary point information is indicated by SFH SP3 using 4 bits, there can exist the number of cases of total 16 boundary points. The 510 SA-preamble sequences (or cell identities) can set the granularity by 30 sequences (or cell identities) each, i.e., by 10 sequences (or cell identities) per segment. Based on this, an example for partitioning the cell identities or SA-preamble sequences is shown in Table 6.

TABLE 6

| Value indicated in 4 bit-SFH SP3 | IDcell partition for public ABS (Number of sequence per each segmentation) | IDcell partition for CSG-femto ABS (Number of sequence per each segmentation) |
|---|---|---|
| 0000 | 86 + 256*n~95 + 256*n (10) | 96 + 256*n~255 + 256*n (160) |
| 0001 | 86 + 256*n~105 + 256*n (20) | 106 + 256*n~255 + 256*n (150) |
| 0010 | 86 + 256*n~115 + 256*n (30) | 116 + 256*n~255 + 256*n (140) |
| 0011 | 86 + 256*n~125 + 256*n (40) | 126 + 256*n~255 + 256*n (130) |
| 0100 | 86 + 256*n~135 + 256*n (50) | 136 + 256*n~255 + 256*n (120) |
| 0101 | 86 + 256*n~145 + 256*n (60) | 146 + 256*n~255 + 256*n (110) |
| 0110 | 86 + 256*n~155 + 256*n (70) | 156 + 256*n~255 + 256*n (100) |
| 0111 | 86 + 256*n~165 + 256*n (80) | 166 + 256*n~255 + 256*n (90) |
| 1000 | 86 + 256*n~175 + 256*n (90) | 176 + 256*n~255 + 256*n (80) |
| 1001 | 86 + 256*n~185 + 256*n (100) | 186 + 256*n~255 + 256*n (70) |
| 1010 | 86 + 256*n~195 + 256*n (110) | 196 + 256*n~255 + 256*n (60) |
| 1011 | 86 + 256*n~205 + 256*n (120) | 206 + 256*n~255 + 256*n (50) |
| 1100 | 86 + 256*n~215 + 256*n (130) | 216 + 256*n~255 + 256*n (40) |
| 1101 | 86 + 256*n~225 + 256*n (140) | 226 + 256*n~255 + 256*n (30) |
| 1110 | 86 + 256*n~235 + 256*n (150) | 236 + 256*n~255 + 256*n (20) |
| 1111 | 86 + 256*n~245 + 256*n (160) | 246 + 256*n~255 + 256*n (10) |

In Table 6, the n indicates a segment ID. A range of cell identity corresponding to public ABS corresponding to each 4-bit information included in SFH SP3 and a range of cell identity corresponding to private ABS are shown.

For instance, in case of receiving information indicating 0000 via SFH SP3, the AMS can be aware that cell identities corresponding to public ABS except macro ABS include cell identities 86 to 95 of segment 0 and cell identities 342 to 351 of segment 1, and cell identities 598 to 607 of segment 2.

Likewise, in case of receiving information indicating 1011 via SFH SP3, the AMS can be aware that cell identities corresponding to public ABS except macro ABS include cell identities 86 to 205 of segment 0 and cell identities 342 to 461 of segment 1, and cell identities 598 to 717 of segment 2.

Meanwhile, in Table 6, if there are only public ABSs except macro ABS or only private ABSs, cell identities may be wasted. For example, although there are only public ABSs except macro ABS, 10 cell identities are allocated per segment if 4-bit information '1111' is received via SFH SP3.

An example for partitioning the cell identities or SA-preamble sequences partially by 20 sequences (or cell identities) per segment is shown in Table 7 for the case that there are only public ABSs except macro ABS or only private ABSs.

TABLE 7

| Value indicated in 4 bit-SFH SP3 | IDcell partition for public ABS (Number of sequence per each segmentation) | IDcell partition for CSG-femto ABS (Number of sequence per each segmentation) |
|---|---|---|
| 0000 | 86 + 256*n~86 + 256*n (0) | 86 + 256*n~255 + 256*n (170) |
| 0001 | 86 + 256*n~105 + 256*n (20) | 106 + 256*n~255 + 256*n (150) |
| 0010 | 86 + 256*n~115 + 256*n (30) | 116 + 256*n~255 + 256*n (140) |
| 0011 | 86 + 256*n~125 + 256*n (40) | 126 + 256*n~255 + 256*n (130) |
| 0100 | 86 + 256*n~135 + 256*n (50) | 136 + 256*n~255 + 256*n (120) |
| 0101 | 86 + 256*n~145 + 256*n (60) | 146 + 256*n~255 + 256*n (110) |
| 0110 | 86 + 256*n~155 + 256*n (70) | 156 + 256*n~255 + 256*n (100) |
| 0111 | 86 + 256*n~165 + 256*n (80) | 166 + 256*n~255 + 256*n (90) |
| 1000 | 86 + 256*n~175 + 256*n (90) | 176 + 256*n~255 + 256*n (80) |
| 1001 | 86 + 256*n~185 + 256*n (100) | 186 + 256*n~255 + 256*n (70) |
| 1010 | 86 + 256*n~195 + 256*n (110) | 196 + 256*n~255 + 256*n (60) |
| 1011 | 86 + 256*n~205 + 256*n (120) | 206 + 256*n~255 + 256*n (50) |
| 1100 | 86 + 256*n~215 + 256*n (130) | 216 + 256*n~255 + 256*n (40) |
| 1101 | 86 + 256*n~225 + 256*n (140) | 226 + 256*n~255 + 256*n (30) |
| 1110 | 86 + 256*n~235 + 256*n (150) | 236 + 256*n~255 + 256*n (20) |
| 1111 | 86 + 256*n~245 + 256*n (160) | 255 + 256*n~255 + 256*n (0) |

In Table 7, if AMS receives 4-bit information '1111' via SFH SP3, AMS can know that all cell identities are cell identities corresponding to public ABSs, except for cell identities corresponding to macro ABS.

Next, the second step partitioning step is explained in detail as follows.

In this case, since a boundary point between the public ABS and the private ABS, sequences indexes 0 to 257 of a macro ABS, and a last sequence index 767 of the private ABS are known in advance, it is possible to indicate range information of sequences (cell identities) corresponding to the ABS type by transmitting boundary information of sequence indexes corresponding to each zone, via an additional broadcast information such as an AAI_SCD (Advanced Air Interface_System Configuration Descriptor) message that is a MAC (medium access control) control message. The boundary information of sequence indexes corresponding to each zone indicates the last index of SA preamble sequence of the corresponding ABS type.

An example for indicating boundary information of sequence indexes is shown in Table 8. The AAI_SCD includes 4-bit SA_PreamblePartition for BS type indicator for each partition, which is ordered by the ABS type, such as macro hot-zone, Relay, OSG femto, CSG-open femto and CSG-closed femto ABS.

TABLE 8

| Value indicated by SA_Preamble Partition for BS type in AAI-SCD | The Last index of IDCell (Number of sequence per each segmentation) |
| --- | --- |
| 0000 | 86 + 256*n |
| 0001 | 105 + 256*n |
| 0010 | 115 + 256*n |
| 0011 | 125 + 256*n |
| 0100 | 135 + 256*n |
| 0101 | 145 + 256*n |
| 0110 | 155 + 256*n |
| 0111 | 165 + 256*n |
| 1000 | 175 + 256*n |
| 1001 | 185 + 256*n |
| 1010 | 195 + 256*n |
| 1011 | 205 + 256*n |
| 1100 | 215 + 256*n |
| 1101 | 225 + 256*n |
| 1110 | 235 + 256*n |
| 1111 | 255 + 256*n |

Referring to table 8, like the first step partitioning, the second step partitioning procedure can indicate a boundary point position by setting granularity to 30 sequences (or cell identities) or 10 sequences (or cell identities) per segment.

If there are five ABS types except macro ABS, then the second step informs an AMS of 5 boundary point information, i.e., totally 5 SA_PreamblePartition for BS type indicators with 20 bits. Yet, the second step can inform an AMS of only 3 boundary point information, as mentioned in the foregoing description, whereas it is enough for the first step to inform an AMS of one boundary point information and another boundary point information can be known by the given number of total sequences.

Assuming three public ABS types (a Macro ABS, a hot-zone ABS, a relay ABS and an OSG-femto ABS) except for macro macro ABS, two boundary information for sequence index is divided by using two 4 bit-fields (two 4 bit-pointers) included in the additional broadcast information.

That is, since sequences corresponding to each of a Macro ABS, a hot-zone ABS, a relay ABS and an OSG-femto ABS are preordering, it is possible to indicate range information of sequences (cell identities) corresponding to public ABS by transmitting information on a boundary point between a hot-zone ABS and a relay ABS, and a boundary point between a relay ABS and an OSG-femto ABS.

Further, assuming three public ABS types (a hot-zone ABS, a relay ABS and an OSG-femto ABS) except for macro ABS and one further division in CSG femto into CSG close femto and CSG open femto, three boundary information for sequence index is divided by three k bit-fields included in the additional broadcast information. Preferably, in the additional broadcast information, a boundary point for public ABS types and a boundary point for private ABS types may be generated separately.

For example, in case of receiving information indicating 1011 via SFH SP3 and receiving information indicating 0010, 1000 and 1101 via AAI-SCD, the AMS can be aware that cell identities corresponding to public ABS except macro ABS include cell identities 86 to 205 of segment 0 and cell identities 342 to 461 of segment 1, and cell identities 598 to 717 of segment 2.

Further, in only segment 0, the AMS can be aware that cell identities corresponding to Macro hot-zone of public ABS include cell identities 86 to 115, cell identities corresponding to Relay of public ABS include cell identities 116 to 175, and cell identities corresponding to OSG femto of public ABS include cell identities 176 to 205. Further, the AMS can be aware that cell identities corresponding to CSG-closed femto of private ABS include cell identities 206 to 225, and cell identities corresponding to CSG-open femto of private ABS include cell identities 226 to 255.

In segment 1, the AMS can be aware that cell identities corresponding to Macro hot-zone of public ABS include cell identities 342 to 371, cell identities corresponding to Relay of public ABS include cell identities 372 to 431, and cell identities corresponding to OSG femto of public ABS include cell identities 432 to 461. Further, the AMS can be aware that cell identities corresponding to CSG-closed femto of private ABS include cell identities 462 to 481, and cell identities corresponding to CSG-open femto of private ABS include cell identities 482 to 511.

Considering total four ABS types irrespective of public ABS and private ABS, it is possible to indicate range information of SA-preamble sequences (cell identities) corresponding to each ABS type by using two 4 bit-pointer or three k bit-pointers.

Figure 9:
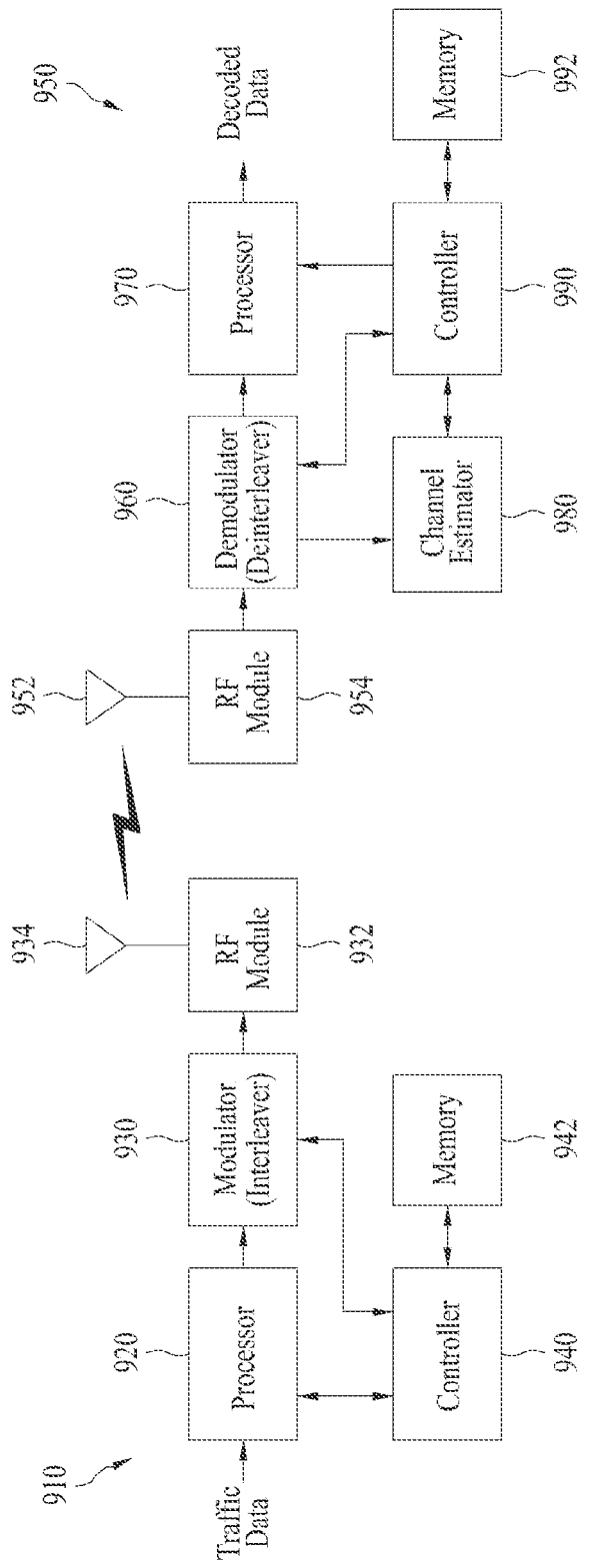
FIG. 9 is a block diagram of an example for a transmitter and receiver according to one embodiment of the present invention.

FIG. 9 is a block diagram for an example of a transmitter and receiver according to one embodiment of the present invention. In downlink, a transmitter 910 is a part of a base station and a receiver 950 is a part of a mobile station. In uplink, a transmitter 910 is a part of a mobile station and a receiver 950 is a part of a base station.

Referring to FIG. 9, in a transmitter 910, a processor 920 generates data symbols by performing encoding, interleaving and symbol mapping on data e.g., traffic data and signaling). And, the pilot processor 920 generates pilot symbols and then multiplexes data and pilot symbols with each other. A modulator 930 generates transmission symbols according to a wireless access scheme. The wireless access scheme includes one of FDMA, TDMA, CDMA, SC-FDMA, MC-FDMA, OFDMA and combinations thereof. And, the modulator 930 enables data to be transmitted by being distributed in a frequency region using one of various permutation schemes proposed by embodiments of the present invention. A radio frequency (RF) module 932 generates an RF signal from a transmission symbol through an antenna 934 by performing signal processing (e.g., analog conversion, amplification, filtering and frequency uplink transform).

The receiver 950 receives a signal transmitted by the transmitter 910 via an antenna 952 and then forwards it to an RF module 954. The RF module 954 provides input samples by performing signal processing (e.g., filtering, amplification, frequency downlink transform, digitalization, etc.) on the received signal.

A demodulator 960 provides a data value and a pilot value by demodulating the input samples. A channel estimator 980 derives a channel estimation value based on the received pilot values. And, the demodulator 960 performs data detection (or equalization) on the received data values using the channel estimation value and then provides data symbol estimation values for the transmitter 910. Moreover, the demodulator 960 is able to rearrange the data distributed in frequency and time domains into data arranged in original order by performing operations reverse to the corresponding one of the various permutation schemes proposed by the embodiments of the present invention. A processor 970 performs symbol demapping, deinterleaving and decoding on the data symbol estimation values and then provides decoded data.

Generally, the processings by the demodulator 960 and the processor 970 in the receiver 950 are mutually supplemented with the processings of the modulator 930 and the Processor 920 in the transmitter, respectively.

A controller/processor 940/990 monitors and controls operations of the modules existing in the transmitter/receiver 910/950. And, program codes and data for the transmitter/receiver 910/950 are stored in a memory 942/992.

The modules exemplarily shown in FIG. 9 are provided for the description only. The transmitter and/or the receiver can further include necessary module(s). The modules/functions are omitted in part or can be separated into different modules. And, at least two modules can be unified into one module.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the terminal. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the terminal may be replaced with terms such as user equipment (UE), mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Accordingly, the present invention is applicable to a wireless communication system, and more particularly, to a wireless mobile communication device used for cellular systems.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of transmitting a cell information, which is transmitted by a base station in a wireless communication system, the method comprising:

broadcasting a first boundary point information (Z) between a cell identity of a public advanced base station (ABS) and a cell identity of a private ABS via a secondary-super frame header subpacket3 (S-SFH SP3), and broadcasting at least one second boundary point (K) information via an Advanced Air Interface-System Configuration Descriptor (AAI-SCD) message, wherein the at least one second boundary point information (K) indicates a last index of cell identity corresponding to a specific ABS type, and wherein an order of ABS types of the public ABS and an order of ABS types of the private ABS are pre-defined, wherein the first boundary point information (Z) comprises a range information of cell identity partitions partitioned by granularity of 10 sequences or 20 sequences per segment, and wherein the range information of cell identity partitions comprises:

information that all cell identities are cell identities of the private ABS, or information that all cell identities are cell identities of the public ABS except for cell identities of a macro ABS.

2. The method of claim 1, wherein the at least one second boundary point information (K) is a boundary point position by setting granularity of 10 sequences or 20 sequences per segment.

3. The method of claim 1, wherein the ABS types of the public ABS includes a Macro ABS, a Macro hot-zone ABS, a relay ABS and an open subcarrier group (OSG) femto ABS.

4. The method of claim 1, wherein the ABS types of the private ABS includes a closed subscriber group (CSG) open-femto ABS and a CSG closed-femto ABS.

5. The method of claim 1, wherein the first boundary point information (Z) includes 86 cell identities for a macro ABS per segment.

6. The method of claim 1, wherein a size of each of the at least one second boundary point information (K) is 4 bits.

7. A method of receiving a cell information, which is received by a mobile station in a wireless communication system, the method comprising:
receiving a first boundary point information (Z) between a cell identity of a public advanced base station (ABS) and a cell identity of a private ABS via a secondary-super frame header subpacket3 (S-SFH SP3) broadcasted from a base station; and
receiving at least one second boundary point (K) information via an Advanced Air Interface-System Configuration Descriptor (AAI-SCD) message broadcasted from the base station,
wherein the at least one second boundary point information (K) indicates a last index of cell identity corresponding to a specific ABS type, and
wherein an order of ABS types of the public ABS and an order of ABS types of the private ABS are pre-defined,
wherein the first boundary point information (Z) comprises a range information of cell identity partitions partitioned by granularity of 10 sequences or 20 sequences per segment, and
wherein the range information of cell identity partitions comprises:
information that all cell identities are cell identities of the private ABS, or
information that all cell identities are cell identities of the public ABS except for cell identities of a macro ABS.

8. The method of claim 7, wherein the at least one second boundary point information (K) is a boundary point position by setting granularity of 10 sequences or 20 sequences per segment.

9. The method of claim 7, wherein the ABS types of the public ABS includes a Macro ABS, a Macro hot-zone ABS, a relay ABS and an open subcarrier group (OSG) femto ABS.

10. The method of claim 7, wherein the ABS types of the private ABS includes a closed subscriber group (CSG) open-femto ABS and a CSG closed-femto ABS.

11. The method of claim 7, wherein the first boundary point information (Z) includes 86 cell identities for a macro ABS per segment.

12. The method of claim 7, wherein a size of each of the at least one second boundary point information (K) is 4 bits.

* * * * *